United States Patent
Suzuki

(10) Patent No.: US 7,870,511 B2
(45) Date of Patent: Jan. 11, 2011

(54) GUI APPLICATION DEVELOPMENT SUPPORTING DEVICE, GUI DISPLAY DEVICE, METHOD, AND COMPUTER PROGRAM

(75) Inventor: Hironori Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 228 days.

(21) Appl. No.: 10/494,557

(22) PCT Filed: Aug. 29, 2003

(86) PCT No.: PCT/JP03/11035

§ 371 (c)(1),
(2), (4) Date: Dec. 10, 2004

(87) PCT Pub. No.: WO2004/023293

PCT Pub. Date: Mar. 18, 2004

(65) Prior Publication Data

US 2005/0091615 A1    Apr. 28, 2005

(30) Foreign Application Priority Data

Sep. 6, 2002  (JP) ............................ P2002-261353

(51) Int. Cl.
*G06F 3/048* (2006.01)
*G06F 3/00* (2006.01)

(52) U.S. Cl. ................... 715/861; 715/762; 715/823; 715/840; 715/856; 715/863

(58) Field of Classification Search .............. 715/762, 715/823, 840, 856, 861, 863, 962, 977, 738, 715/779, 810; 345/502
See application file for complete search history.

(56) References Cited

U.S. PATENT DOCUMENTS

| | | | | |
|---|---|---|---|---|
| 4,698,625 A | * | 10/1987 | McCaskill et al. | 345/157 |
| 4,847,605 A | * | 7/1989 | Callahan et al. | 715/856 |
| 5,214,414 A | * | 5/1993 | Levine et al. | 345/157 |
| 5,448,693 A | * | 9/1995 | Blades et al. | 715/835 |
| 5,488,685 A | * | 1/1996 | Palmer et al. | 715/708 |
| 5,544,299 A | * | 8/1996 | Wenstrand et al. | 715/804 |
| 5,642,131 A | * | 6/1997 | Pekelney et al. | 715/862 |
| 5,655,093 A | * | 8/1997 | Frid-Nielsen | 715/856 |
| 5,673,401 A | * | 9/1997 | Volk et al. | 725/139 |
| 5,687,331 A | * | 11/1997 | Volk et al. | 715/840 |

(Continued)

FOREIGN PATENT DOCUMENTS

JP    9-16370    1/1997

(Continued)

*Primary Examiner*—Steven B Theriault
(74) *Attorney, Agent, or Firm*—Finnegan, Henderson, Farabow, Garrett & Dunner, L.L.P.

(57) ABSTRACT

An apparatus and method, which make it possible to easily set and execute various animation representations according to the state of a cursor, are provided. In association with each of a state of a cursor or of a component located where the cursor is set, different read image data are set in association with a graphics representation program file. Such different animation displays according to the state of the cursor as animation for a focused state where the cursor is set on a component, image data for when the cursor moves between components and the like become possible, and in GUI-equipped devices, a GUI with which users will not lose sight of the cursor and which is highly visually effective can be realized.

9 Claims, 18 Drawing Sheets

U.S. PATENT DOCUMENTS

| | | | | |
|---|---|---|---|---|
| 5,740,390 A * | 4/1998 | Pickover et al. | ............. | 715/835 |
| 5,754,178 A * | 5/1998 | Johnston et al. | ............. | 715/769 |
| 5,757,358 A * | 5/1998 | Osga | ........................ | 715/862 |
| 5,767,835 A * | 6/1998 | Obbink et al. | .............. | 715/861 |
| 5,784,056 A * | 7/1998 | Nielsen | ...................... | 715/856 |
| 5,786,818 A * | 7/1998 | Brewer et al. | .............. | 715/822 |
| 5,796,404 A * | 8/1998 | Gentner | ..................... | 715/823 |
| 5,808,604 A * | 9/1998 | Robin | ....................... | 715/862 |
| 5,867,175 A * | 2/1999 | Katzenberger et al. | ...... | 345/473 |
| 5,880,729 A * | 3/1999 | Johnston et al. | ............. | 715/823 |
| 5,898,432 A * | 4/1999 | Pinard | ....................... | 715/861 |
| 5,963,191 A * | 10/1999 | Jaaskelainen, Jr. | .......... | 715/856 |
| 5,990,862 A * | 11/1999 | Lewis | ......................... | 715/858 |
| 6,018,345 A * | 1/2000 | Berstis | ........................ | 715/859 |
| 6,023,275 A * | 2/2000 | Horvitz et al. | .............. | 715/700 |
| 6,034,689 A * | 3/2000 | White et al. | ................ | 715/854 |
| 6,046,722 A * | 4/2000 | McKiel, Jr. | ................. | 715/862 |
| 6,067,085 A * | 5/2000 | Modh et al. | ................. | 715/711 |
| 6,072,485 A * | 6/2000 | Barnes et al. | ............... | 715/802 |
| 6,097,390 A * | 8/2000 | Marks | ........................ | 715/772 |
| 6,100,871 A * | 8/2000 | Min | .......................... | 715/861 |
| 6,104,391 A * | 8/2000 | Johnston et al. | ............. | 715/745 |
| 6,137,487 A * | 10/2000 | Mantha | ...................... | 715/767 |
| 6,222,537 B1 * | 4/2001 | Smith et al. | ................. | 715/762 |
| 6,249,284 B1 * | 6/2001 | Bogdan | ...................... | 715/764 |
| 6,259,432 B1 * | 7/2001 | Yamada et al. | .............. | 345/159 |
| 6,266,043 B1 * | 7/2001 | Robin | ......................... | 715/858 |
| 6,285,374 B1 * | 9/2001 | Falcon | ........................ | 715/856 |
| 6,323,884 B1 * | 11/2001 | Bird et al. | ................... | 715/810 |
| 6,337,702 B1 * | 1/2002 | Bates et al. | .................. | 715/857 |
| 6,362,840 B1 * | 3/2002 | Burg et al. | ................... | 715/835 |
| 6,407,760 B1 * | 6/2002 | Aritomi | ...................... | 715/810 |
| 6,545,666 B1 * | 4/2003 | Culler | ......................... | 345/168 |
| 6,587,131 B1 * | 7/2003 | Nakai et al. | .................. | 715/857 |
| 6,597,383 B1 * | 7/2003 | Saito | ........................... | 715/860 |
| 6,614,457 B1 * | 9/2003 | Sanada et al. | ............... | 715/840 |
| 6,642,947 B2 * | 11/2003 | Feierbach | ................... | 715/861 |
| 6,717,600 B2 * | 4/2004 | Dutta et al. | .................. | 715/862 |
| 6,807,668 B2 * | 10/2004 | Stern et al. | ................... | 719/329 |
| 6,865,719 B1 * | 3/2005 | Nicholas, III | ............... | 715/856 |
| 6,867,790 B1 * | 3/2005 | Brooks | ....................... | 715/856 |
| 6,892,360 B1 * | 5/2005 | Pabla et al. | .................. | 715/802 |
| 6,947,062 B2 * | 9/2005 | Cuijpers et al. | .............. | 715/767 |
| 6,954,196 B1 * | 10/2005 | Lipscomb et al. | ........... | 345/156 |
| 6,971,071 B1 * | 11/2005 | Impas et al. | ................. | 715/859 |
| 6,981,229 B1 * | 12/2005 | Balakrishnan et al. | ...... | 715/863 |
| 6,992,681 B2 * | 1/2006 | Evans et al. | .................. | 345/581 |
| 7,010,761 B2 * | 3/2006 | Chatani et al. | .............. | 715/861 |
| 7,020,846 B2 * | 3/2006 | Marmolin et al. | ........... | 715/854 |
| 7,062,717 B2 * | 6/2006 | Scott | .......................... | 715/767 |
| 7,137,068 B1 * | 11/2006 | Robin | ........................ | 715/700 |
| 7,181,700 B2 * | 2/2007 | Guerrero | .................... | 715/810 |
| 7,197,717 B2 * | 3/2007 | Anderson et al. | ........... | 715/767 |
| 7,262,775 B2 * | 8/2007 | Calkins et al. | .............. | 345/473 |
| 7,370,281 B2 * | 5/2008 | Weber | ........................ | 715/769 |
| 7,480,863 B2 * | 1/2009 | Branson et al. | .............. | 715/711 |
| 7,503,012 B2 * | 3/2009 | Chen et al. | .................. | 715/769 |
| 7,548,955 B2 * | 6/2009 | Nicholas, III | ............... | 709/206 |
| 2002/0109721 A1 * | 8/2002 | Konaka et al. | .............. | 345/762 |
| 2003/0021398 A1 * | 1/2003 | Donnelly et al. | ......... | 379/93.17 |
| 2003/0052919 A1 * | 3/2003 | Tlaskal et al. | ............... | 345/764 |
| 2003/0231218 A1 * | 12/2003 | Amadio | ..................... | 345/861 |
| 2004/0090463 A1 * | 5/2004 | Celik et al. | .................. | 345/767 |
| 2004/0113888 A1 * | 6/2004 | De Waal | ..................... | 345/157 |
| 2004/0135824 A1 * | 7/2004 | Fitzmaurice | ................ | 345/856 |
| 2004/0237053 A1 * | 11/2004 | Impas et al. | ................. | 715/856 |
| 2005/0015730 A1 * | 1/2005 | Gunturi et al. | .............. | 715/777 |
| 2005/0088410 A1 * | 4/2005 | Chaudhri | .................... | 345/157 |
| 2005/0091604 A1 * | 4/2005 | Davis | .......................... | 715/772 |
| 2005/0231512 A1 * | 10/2005 | Niles et al. | .................. | 345/473 |
| 2009/0113330 A1 * | 4/2009 | Garrison et al. | ............. | 715/769 |

FOREIGN PATENT DOCUMENTS

| | | |
|---|---|---|
| JP | 10-124246 | 5/1998 |
| JP | 2002-149144 | 5/2002 |

\* cited by examiner

```
+-[application]
   +-Application
      +-[customtoolkit]
         +-CButton.java
         +-CComponentFactory.java
         +-[laf]
            +-[custom]
               +-Buttcon.java
               +-[images]
                  +-buttcon_normal.off.gif
                  +-buttcon_normal.on.gif
                  +-buttcon_pushed.gif
```

FIG. 5

FIG. 16
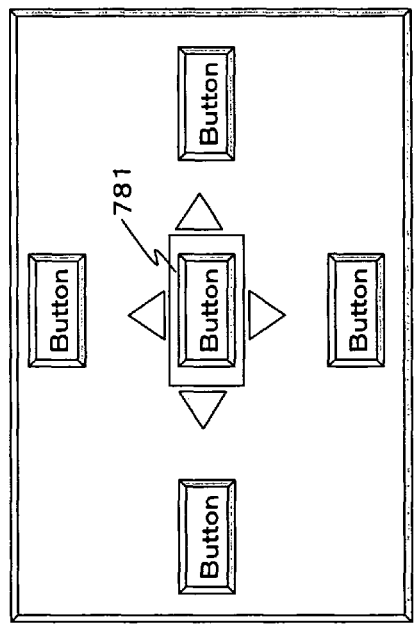
(a)
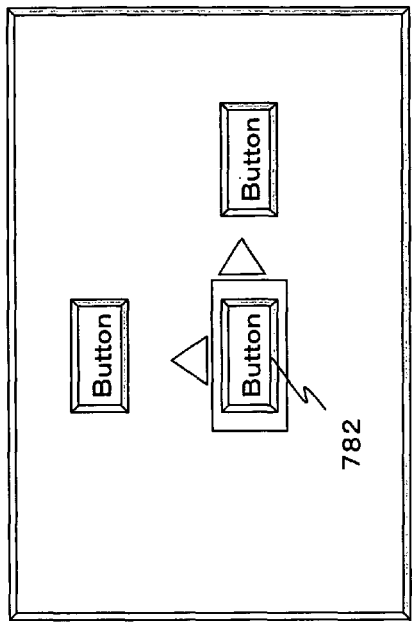
(b)
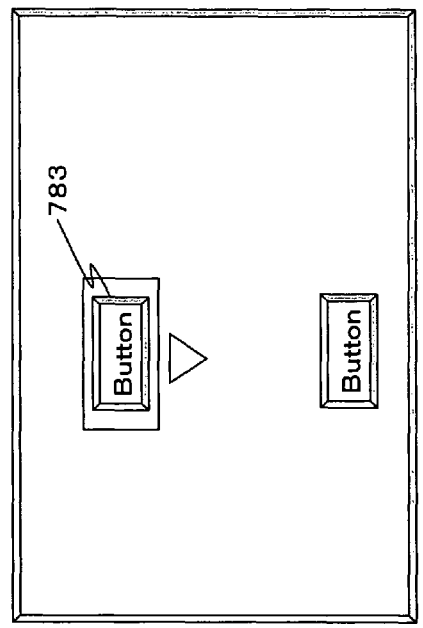
(c)
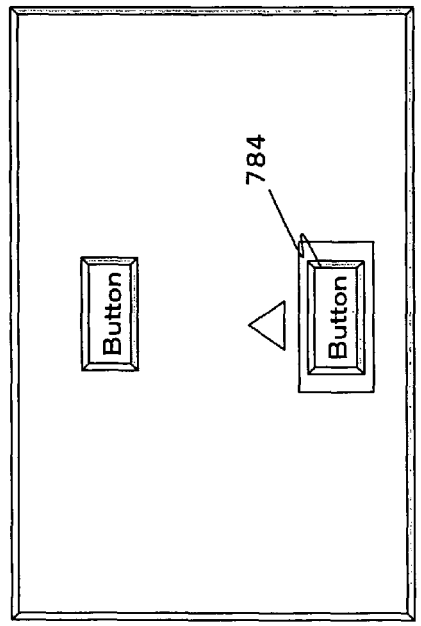
(d)

GUI APPLICATION DEVELOPMENT SUPPORTING DEVICE, GUI DISPLAY DEVICE, METHOD, AND COMPUTER PROGRAM

TECHNICAL FIELD

The present invention relates to a GUI application development supporting apparatus, a GUI display apparatus, method and computer program. More specifically, the present invention relates to a GUI application development supporting apparatus, a GUI display apparatus, method and computer program that improve visual effectiveness and make a more intuitive display of cursor positions and cursor movements possible by carrying out animation display for a cursor displayed in a graphical user interface (GUI).

BACKGROUND ART

Displays such as CRT and LCD are used as data display interfaces or data user input/output interfaces for PCs, communications terminals and various information appliances. For such displays, a screen image, for which functions that suit the usage of an information appliance are set, is displayed, for example, as a graphical user interface (GUI). Various functions, such as the arrangement of input buttons, settings for data input fields, processes to be carried out when the buttons are pressed, for example, are set for the GUI. As a programming language for developing application programs for setting the design and functions of such user interface screens, Java, which is distributed by Sun Microsystems, Inc., is used widely.

A program written in Java is converted into byte code as a computer/platform-independent Java executable file format, read by a Java virtual machine (Java VM) and converted (interpreted) into machine language and run on various apparatuses.

In Java, in order to create application software easily in a short period of time, software components that do not require re-compiling are prepared in advance, and programs are created by combining those components. In Java, a technology for making these components reusable (Java Beans) is constructed.

Components are set in units of various components such as, for example, windows to be displayed on a display, buttons, lists, combo boxes, text input fields and the like. For these components, there are defined "property" as attribute information such as, for example, shapes of buttons, position information and the like, "method" as a process as the result of an action for a component, and further "event" as a function for, when an action with respect to a component, such as the arrival of data, the occurrence of an interruption, the alteration of properties, the calling of a method or the like, occurs, communicating the event to another component. These "properties," "methods" and "events" are taken to be elements of components in Java Beans.

The smallest executable program unit in Java is referred to as "class" and a Java Program is constituted by one or more classes. A class has a variable as data and a method as an action. It is possible to forward and store this program component that is set as a class to a PC or an information appliance through a network such as the Internet or a LAN, and on the side of the apparatus in which the class file is stored, a platform-independent Java virtual machine is able to run the program saved in the class file.

As key elements of a GUI, there are cursors and pointers. A cursor or pointer moves based on input information from, for example, a mouse, a keyboard, arrow keys of a remote control or the like as user input devices, and indicate valid input position information. In the description to follow, cursor will be used as an inclusive term for a concept that includes cursors and pointers. The displaying of cursor positions in conventional devices is commonly carried out by a bar representing a cursor, highlighting a specified area, making an icon blink and so forth.

Cursor display processes in conventional devices are of a configuration where a file that stores display image data corresponding to the cursor is set, and a display mode, such as repeated blinking patterns or specific image data display, defined for the file is executed. However, the image of such a cursor is mostly one with which a specific image data is associated, and is fixed regardless of the status of the cursor. Therefore, there is a problem in that it is hard for the user to tell the difference between whether, for example, the cursor is stationary or moving.

In addition, various information appliances can be thought of as devices in which a GUI may be implemented, but few of these would have input means that are capable of executing move instructions for a cursor freely in all directions like a mouse of a PC, and many of them carry out move control of a cursor through only the combination of move instruction keys for the four directions of up, down, left and right used in remote controls, for example, and an enter key.

When cursor move instructions based on such simple input devices are carried out, the moving of the cursor is not necessarily carried out in a linear manner with respect to the destination of the cursor movement, the cursor movement caused by user operation and the movement of the user's sight do not match, and there arises the problem of losing sight of the cursor movement, and the like.

DISCLOSURE OF THE INVENTION

The present invention is made in view of the problems above, and makes it its object to provide a GUI application development supporting apparatus, a GUI display apparatus, method and computer program that make it possible, when a cursor (focus) is set on each component, for example, a button, data input field, combo box, list and the like, that is set in a graphical user interface or with respect to cursor (focus) movement between each component, to execute animation representation corresponding to its state so that a user can easily recognize the cursor position, and, in addition, so that even when the cursor moves, the user can easily recognize its movement path.

The first aspect of the present invention is a GUI application development supporting apparatus that supports the development of a GUI application that has cursor display information with respect to a graphical user interface (GUI), the GUI application development supporting apparatus characterized in that it includes:

a graphics representation program file that stores a program related to graphics representation for a cursor or a component on which the cursor is set;

an image storage section that stores animation image data that can be read in accordance with the execution of the above-mentioned graphics representation program; and an edit processing section that executes a process of associating image data that is read at the time of execution of the above-mentioned graphics representation program in accordance with the state of the cursor or the component located where the cursor is set.

Further, an embodiment of a GUI application development supporting apparatus of the present invention is characterized in that the above-mentioned edit processing section has a configuration where it executes, with respect to a focused-state component which is in a state where the cursor is set, a process of associating an animation that has directional information indicating a direction in which the cursor can move.

Further, an embodiment of a GUI application development supporting apparatus of the present invention is characterized in that the above-mentioned edit processing section has a configuration where it is capable of setting different read image data in association with each of a focused state where the above-mentioned cursor is set on a component and a cursor moving state where the above-mentioned cursor moves between components.

Further, an embodiment of a GUI application development supporting apparatus of the present invention is characterized in that the above-mentioned edit processing section has a configuration where it is capable of setting different read image data in association with each of the state of the above-mentioned cursor or of the component located where the cursor is set.

Further, an embodiment of a GUI application development supporting apparatus of the present invention is characterized in that the above-mentioned edit processing section is of a configuration where a GUI component is generated by combining a logical component corresponding to a component and a graphics representation component including the above-mentioned graphics representation program file, and is of a configuration where the above-mentioned edit processing section generates a GUI component in which image data according to the cursor or component state is associated with the above-mentioned graphics representation component.

Further, the second aspect of the present invention is a GUI display apparatus that executes animation representation of a cursor or a GUI component on which the cursor is set on a display, the GUI display apparatus characterized in that it includes:

a focus navigator that executes a search process by a search engine based on cursor movement instruction input information and determines a cursor move destination;

a focus manager that executes a move process for a cursor in accordance with cursor move destination instruction information determined by the above-mentioned focus navigator; and a focus object that executes an animation display process according to the state of the cursor or a GUI component on which the cursor is set that accompanies the cursor movement executed by the above-mentioned focus manager.

Further, an embodiment of a GUI display apparatus of the present invention is characterized in that images constituting the above-mentioned animation include an image that has directional information indicating a direction in which the cursor can move, and in that the above-mentioned focus object is of a configuration where it executes, with respect to a component in a focused state, an animation display process based on the above-mentioned image having directional information.

Further, an embodiment of a GUI display apparatus of the present invention is characterized in that the above-mentioned focus object is of a configuration where it executes animation display processes comprised of images that differ between a focused state where the cursor is set on a component and a cursor moving state where the cursor moves between components.

Further, the third aspect of the present invention is a GUI application program generating method that generates a GUI application that has cursor display information with respect to a graphical user interface (GUI), the GUI application program generating method characterized in that it includes:

a graphics representation component selection step of selectively extracting a graphics representation component from a graphics representation program file storage section that stores a program related to graphics representation for a cursor or a component on which the cursor is set; and an edit processing step of setting image data according to the state of the cursor or the component located where the cursor is set in association with the graphics representation component selected in the above-mentioned graphics representation component selection step.

Further, an embodiment of a GUI application program generating method of the present invention is characterized in that the above-mentioned edit processing step includes a step of executing, with respect to a focused-state component which is in a state where the cursor is set, a process of associating an animation having directional information indicating a direction in which the cursor can move.

Further, an embodiment of a GUI application program generating method of the present invention is characterized in that the above-mentioned edit processing step includes a step of setting different read image data in association with each of a focused state where the above-mentioned cursor is set on a component and a cursor moving state where the above-mentioned cursor moves between components.

Further, an embodiment of a GUI application program generating method of the present invention is characterized in that the above-mentioned edit processing step includes a step of setting different read image data in association with each of the state of the above-mentioned cursor or of a component located where the cursor is set.

Further, an embodiment of a GUI application program generating method of the present invention is characterized in that the above-mentioned edit processing step includes a step of generating a GUI component by combining a logical component corresponding to a component and a graphics representation component including the above-mentioned graphics representation program file, and a step of generating a GUI component in which image data according to the state of the cursor or of the component is associated with the above-mentioned graphics representation component.

Further, the fourth aspect of the present invention is an animation display processing method that executes, on a display, animation representation of a cursor or of a GUI component on which the cursor is set, the animation display processing method characterized in that it includes:

a step of executing a search process by a search engine based on cursor move instruction input information and determining a cursor move destination;

a step of executing a move process of the cursor in accordance with the determined move destination instruction information for the cursor; and an animation display step of executing an animation display process according to the state of the cursor or a GUI component on which the cursor is set that accompanies cursor movement.

Further, an embodiment of an animation display processing method of the present invention is characterized in that images constituting the above-mentioned animation include an image having directional information indicating a direction in which the cursor can move, and in that the above-mentioned animation display step executes, with respect to a component in a focused state, an animation display process based on the above-mentioned image having directional information.

Further, an embodiment of an animation display processing method of the present invention is characterized in that the above-mentioned animation display step executes an animation display process comprised of images that differ between a focused state where the cursor is set on a component and a cursor moving state where the cursor moves between components.

Further, the fifth aspect of the present invention is a computer program that executes a GUI application program generating process having cursor display information with respect to a graphical user interface (GUI), the computer program characterized in that it includes:

a graphics representation component selection step of selectively extracting a graphics representation component from a graphics representation program file storage section that stores a program related to graphics representation for a cursor or a component on which the cursor is set; and an edit processing step of setting image data according to the state of the cursor or of the component located where the cursor is set in association with the graphics representation component selected in the above-mentioned graphics representation component selection step.

Further, the sixth aspect of the present invention is a computer program that executes, on a display, an animation display process for a cursor or a GUI component on which the cursor is set, the computer program characterized in that it includes:

a step of executing a search process by a search engine based on cursor move instruction input information and determining a cursor move destination;

a step of executing a move process of the cursor in accordance with the determined move destination instruction information for the cursor; and an animation display step of executing an animation display process according to the state of the cursor or a GUI component on which the cursor is set that accompanies cursor movement.

According to a GUI application development supporting apparatus of the present invention, since a configuration is adopted where there is included a graphics representation program file that stores a program related to graphics representation for a cursor or a component on which the cursor is set, an image storage section that stores animation image data that can be read in accordance with the execution of the graphics representation program, and an edit processing section that executes a process of associating image data that is read at the time of execution of the graphics representation program in accordance with the state of the cursor or the component located where the cursor is set, and where, at the edit processing section, different read image data can be set in association with each of the state of the cursor or of the component located where the cursor is set, it becomes possible to freely set animation according to the cursor state, and it becomes possible to easily carry out a process of setting optimal animation corresponding to the cursor that is adapted to the GUI-equipped device.

Further, according to a configuration of the present invention, since it is made possible, with respect to a focused-state component in a state where a cursor is set, to execute a process of associating animation having directional information indicating a direction in which the cursor can move, it becomes possible to provide a GUI that is easy to operate for the user.

Further, according to a configuration of the present invention, since a configuration is adopted where the logical part and the graphics representation part of a component are configured separately, a GUI component is generated based on the logical part and the graphics representation part, and the graphics representation part is made to have an animation execution function based on images according to the state of the cursor or the component, it becomes possible to easily set or alter the mode of animation for the component or the cursor.

Further, according to a GUI display apparatus of the present invention, since a configuration is adopted where a search process by a search engine is executed and a cursor move destination determined based on cursor move instruction input information, and a cursor move process is executed in accordance with the determined cursor move destination instruction information, while at the same time an animation display process according to the state of the cursor or a GUI component on which the cursor is set that accompanies cursor movement is executed, a GUI that is highly visually effective and makes it possible to readily identify the movement status of the cursor and the component on which the cursor is set is realized.

Further, with a GUI display apparatus of the present invention, since a configuration is adopted where an animation display process comprised of an image having directional information indicating a direction in which a cursor can move is executed, a GUI that is easy to operate for the user is realized.

In addition, a computer program of the present invention is a computer program that can be provided to, for example, a general-purpose computer system, which is capable of running various program codes, through storage media and communications media that provide them in a computer readable format, examples of which include recording media such as CDs, FDs, MDs and the like, or communications media such as networks. By providing such a program in a computer readable format, a process according to the program is realized on a computer system.

Other objects, features and advantages of the present invention should become apparent from a more detailed description based on embodiments of the present invention that are described below and from the appended drawings. A system as used in the present description refers to a logical aggregate configuration of a plurality of apparatuses, and is not limited to one in which each constituent apparatus resides in the same body.

BRIEF DESCRIPTION OF THE DRAWINGS

FIG. 5 is a diagram illustrating an example of a file configuration necessary for executing processes of a GUI application development supporting apparatus of the present invention;

FIG. 16 is a diagram showing an example of displaying a cursor movable direction identification mark for a component on a GUI displaying display;

BEST MODES FOR CARRYING OUT THE INVENTION

Figure 1:
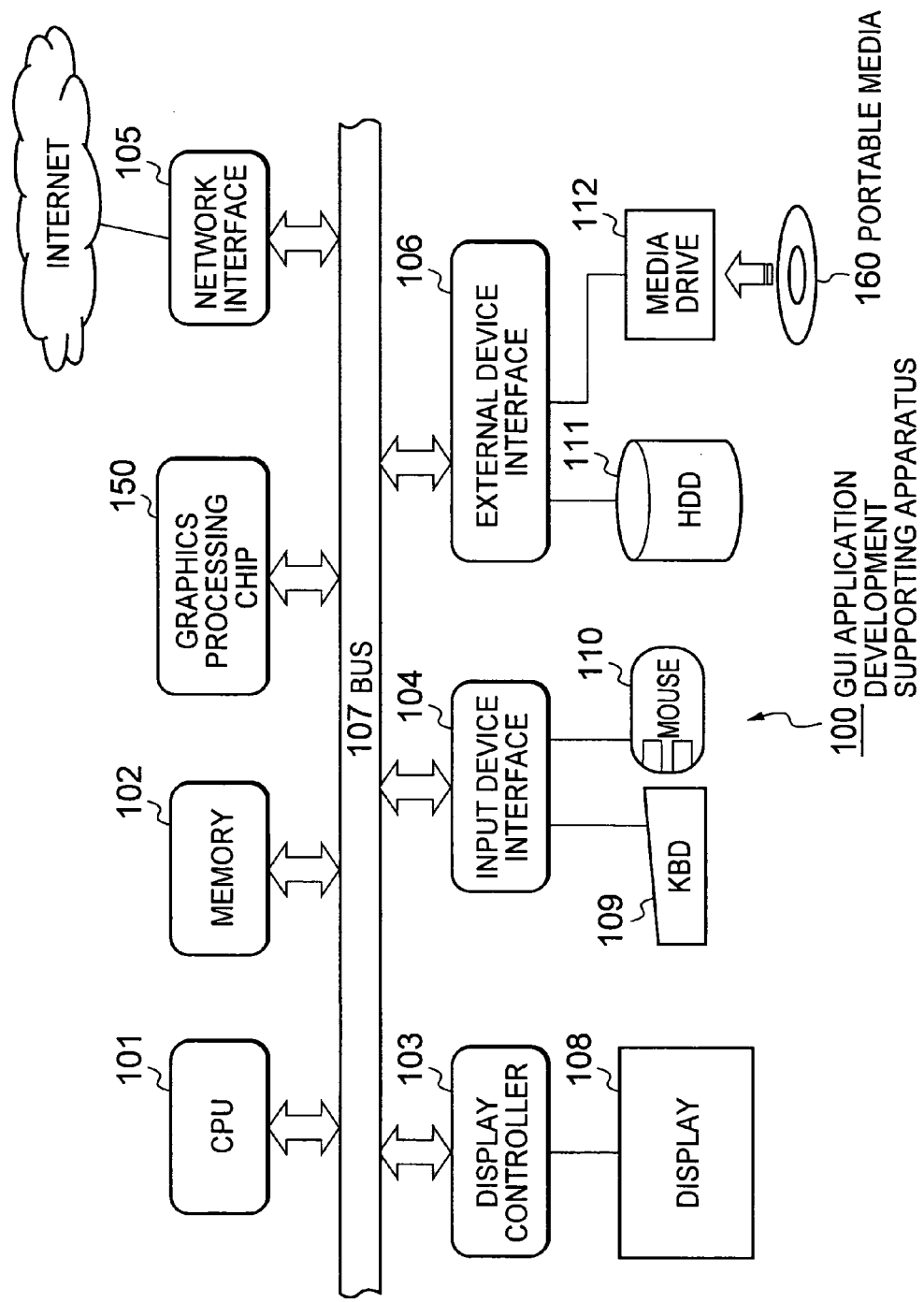
FIG. 1 is a diagram showing a hardware configuration example of a GUI application development supporting apparatus of the present invention.

Below, a GUI application development supporting apparatus, a GUI display apparatus, method and computer program of the present invention will be described in detail with reference to the drawings.

[1. Hardware Configuration]

First, a hardware configuration example of a GUI application development supporting apparatus of the present invention will be described with reference to FIG. 1. Each element within a GUI application development supporting apparatus 100 will be described with reference to FIG. 1. A CPU (Central Processing Unit) 101, which is the main controller of the GUI application development supporting apparatus 100, executes various kinds of GUI application development programs under the control of an operating system (OS). The CPU 101 performs, for example, the execution of a program creating process based on the Java language, specifically processes of setting functions, setting the display image and the like of each component, such as buttons, combo boxes and the like, that is set on a GUI screen. As shown in drawing, the CPU 101 is interconnected with other constituent parts through a bus 107.

A memory 102 is a storage device that is used to store program codes to be run by the CPU 101 or to temporarily store working data under execution. The memory 102 shown in the same diagram includes both a non-volatile memory such as ROM as well as a volatile memory such as DRAM.

A graphics processing chip 150 is a chip into which is incorporated a dedicated processing circuit that executes color processing for various GUI components.

A display controller 103 as a display control section is a dedicated controller for actually processing draw commands issued by the CPU 101. The draw data processed by the display controller 103 is screen outputted by a display 108 after, for example, being once written in a frame buffer (not shown). For example, an image reproduced from a HDD (111) or an image processed by the CPU 101 may be displayed on the display 108, and a user may view the presented screen.

An input device interface 104 is an apparatus for connecting user input devices, such as a keyboard 109, a mouse 110 and the like, to the GUI application development supporting apparatus 100. The user is able to input commands for processing or displaying images and the like through the keyboard 109 and the mouse 110.

In compliance with a predetermined communications protocol such as Ethernet, a network interface 105 is capable of connecting the GUI application development supporting apparatus 100 to a local network such as a LAN (Local Area Network), and further to a wide area network such as the Internet.

A plurality of host terminals and servers (not shown) are connected on a network in a transparent state and a distributed computing environment is constructed. Distribution services of software programs and data contents can be provided on the network. For example, image data from another server in which moving images, still images and the like are stored can be downloaded to the HDD (111) via the network.

An external device interface 106 is an apparatus for connecting external apparatuses, such as a digital camera, the hard disk drive (HDD) 111, a media drive 112 and the like, to the GUI application development supporting apparatus 100.

The HDD 111 is an external storage apparatus in which a magnetic disk as a storage medium is fixedly mounted, and is advantageous in terms of storage capacity, data transfer rate and the like, and allows for random access. For example, program installation where a software program is stored on the HDD 111 in an executable condition is possible. On the HDD 111, program codes of the operating system, application programs and device drivers to be run by the CPU 101 are stored in a non-volatile manner.

The media drive 112 is an apparatus into which portable media 160, such as a CD (Compact Disc), an MO (Magneto-Optical disc), a DVD (Digital Versatile Disc) and the like, can be loaded, and which is for accessing the data recording surface thereof.

The portable media 160 are used primarily for purposes such as backing up software programs, data files and the like as data in a computer readable format, and transferring them between systems (that is, including sales, circulation and distribution). It is possible to physically circulate and distribute an application program for performing various processes between a plurality of devices using these portable media.

In addition, an apparatus such as the one shown in FIG. 1 can be realized as a compatible machine or a succeeding machine of IBM Corporation's personal computer "PC/AT (Personal Computer/Advanced Technology." Naturally, it is also possible to apply a computer equipped with a different architecture.

[2. Functional Configuration]

Next, the functional configuration of a GUI application development supporting apparatus of the present invention that develops a GUI application by separately configuring the logical part and the graphics representation part of each component that is set in a graphical user interface (GUI) will be described with reference to FIG. 2.

Figure 2:
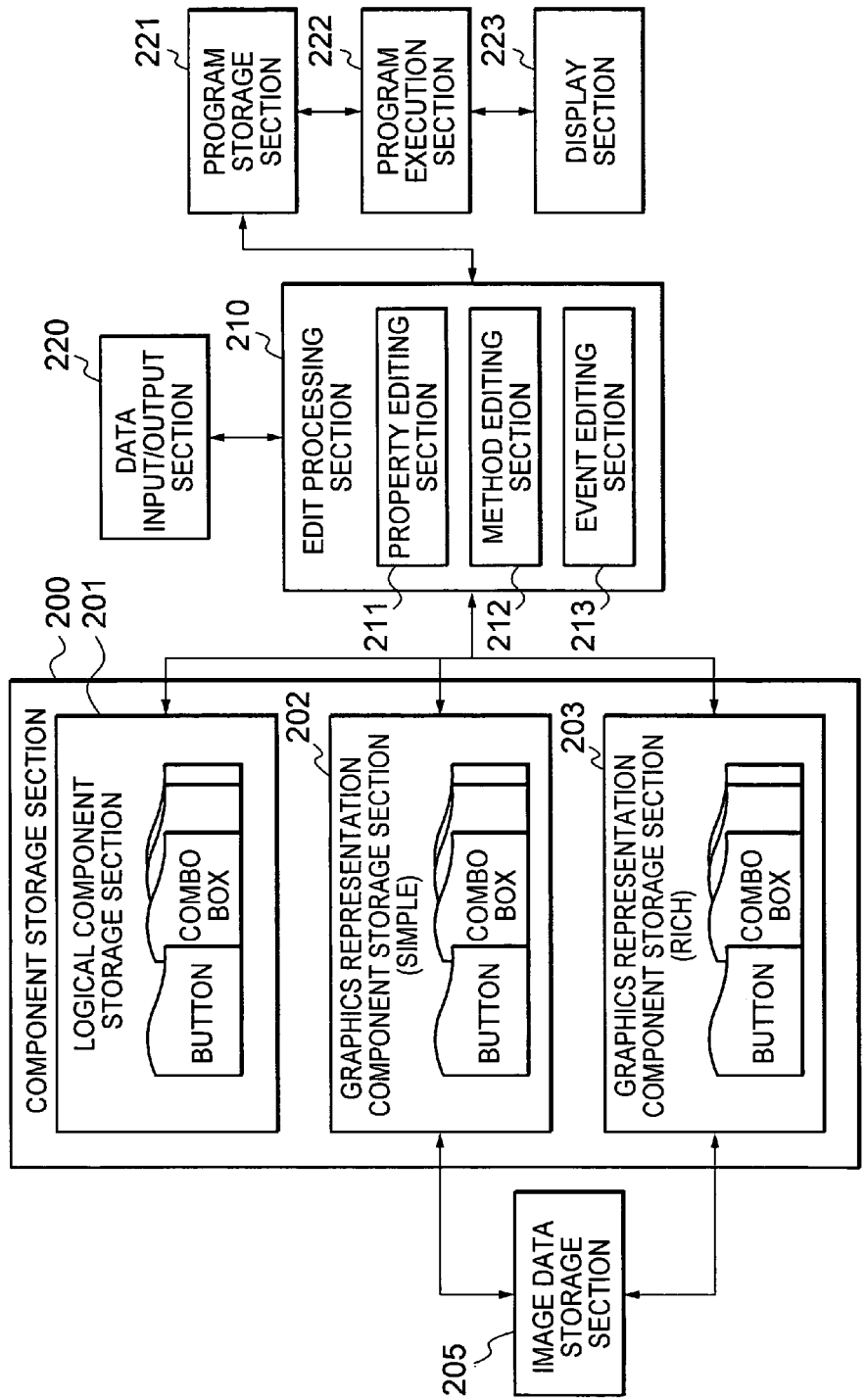
FIG. 2 is a block diagram showing the functional configuration of a GUI application development supporting apparatus of the present invention.

As shown in FIG. 2, a GUI application development supporting apparatus of the present invention has a component storage section 200 in which various parts (components) to be set on a screen that is to serve as a user interface, such as buttons, combo boxes, lists, windows, text boxes and the like, are stored. The component storage section 200 includes a logical component storage section 201, a graphics representation component storage section (Simple) 202 and a graphics representation component storage section (Rich) 203.

The logical component storage section 201 is a component that stores logical information regarding various parts (components) to be set on a screen that is to serve as a user interface, such as buttons, combo boxes, lists, windows, text boxes and the like. For example, if it were a button, it is configured as a software program component that defines functions, such as the process for when it is turned on, the process for when it is turned off and the like, as functions of the button.

On the other hand, the graphics representation component storage section (Simple) 202 and the graphics representation component storage section (Rich) 203 are configured as software program components that store display image information of components, that is, as software program components that store a graphics representation program. The graphics representation component storage section (Simple) 202 and the graphics representation component storage section (Rich) 203 are components that each store a program that executes a different graphics representation.

An image data storage section 205 stores image data such as, for example, jpeg, gif and the like. By associating these image data with the graphics representation component of each component, animation display based on image data according to various operations of components becomes possible. Such animation setting processes will be described later.

An operator as a developer of GUI application programs executes various data input with respect to an edit processing section 210 via a data input/output section 220, and constructs a GUI component by setting the function and graphical image of each component, such as a button, combo box or the like.

A creation process execution program for components is, for example, one class (factory class) of a JAVA program. The edit processing section 210 creates various components by executing the factory class. In addition, processing by the edit processing section 210 is, in the case of the hardware configuration shown in FIG. 1, is processing executed under the control of the CPU 101.

Components are edited at the edit processing section 210 as GUI components for which "property" as attribute information such as, for example, shapes of buttons, position information and the like, "method" as a process as the result of an action for a component, and further "event" as a function for, when an action with respect to a component, such as the arrival of data, the occurrence of an interruption, the alteration of properties, the calling of a method or the like, occurs, communicating the event to another component are defined.

The edit processing section 210 includes a property editing section 211 that edits properties set for components, a method editing section 212 that edits methods, and an event editing section 213 that edits events.

In setting the look, that is, the graphics representation, of a GUI component to be generated, the operator inputs look & feel package specification data with respect to the edit processing section 210 that executes the factory class. In other words, the operator specifies either "Rich" or "Simple."

In accordance with this specification data, the factory class is executed at the edit processing section 210, and depending on the specification data, the corresponding program component is read from either the graphics representation component storage section (Simple) 202 or the graphics representation component storage section (Rich) 203, while at the same time the component is generated along with a component read from the logical component storage section 201.

For example, in generating a GUI component with respect to a button, a button component is read from the logical component storage section 201 that stores components in which logical information regarding components is stored, and further, depending on the look & feel package specification data from the operator, namely the specification data of either "Rich" or "Simple," a component storing a graphics representation program of the button is read from the graphics representation component storage section (Simple) 202 or the graphics representation component storage section (Rich) 203, and a single button component is generated by combining the logical component and either the "Rich" or "Simple" graphics representation component.

A similar editing process is executed for various components other than buttons, such as combo boxes, lists, windows, text boxes and the like, and after the editing process, the set GUI application program is stored in a program storage section 221, executed at a program execution section 222, and the generated GUI is displayed on a display section 223.

In addition, in the embodiment described above, an example was described where only the two types of "Simple" and "Rich" were set for components that store a graphics representation program, but the number of types may also be set to an arbitrary number of 3 and above, and the operator may input some specification data of the graphics representation components that are set, whereby a graphics representation component is selected in accordance with the specification data, and various GUI components created.

[3. Processing Sequence]

Next, the procedures in a process for generating a GUI component by applying a GUI application development supporting apparatus of the present invention will be described with reference to FIG. 3 and FIG. 4.

Figure 3:
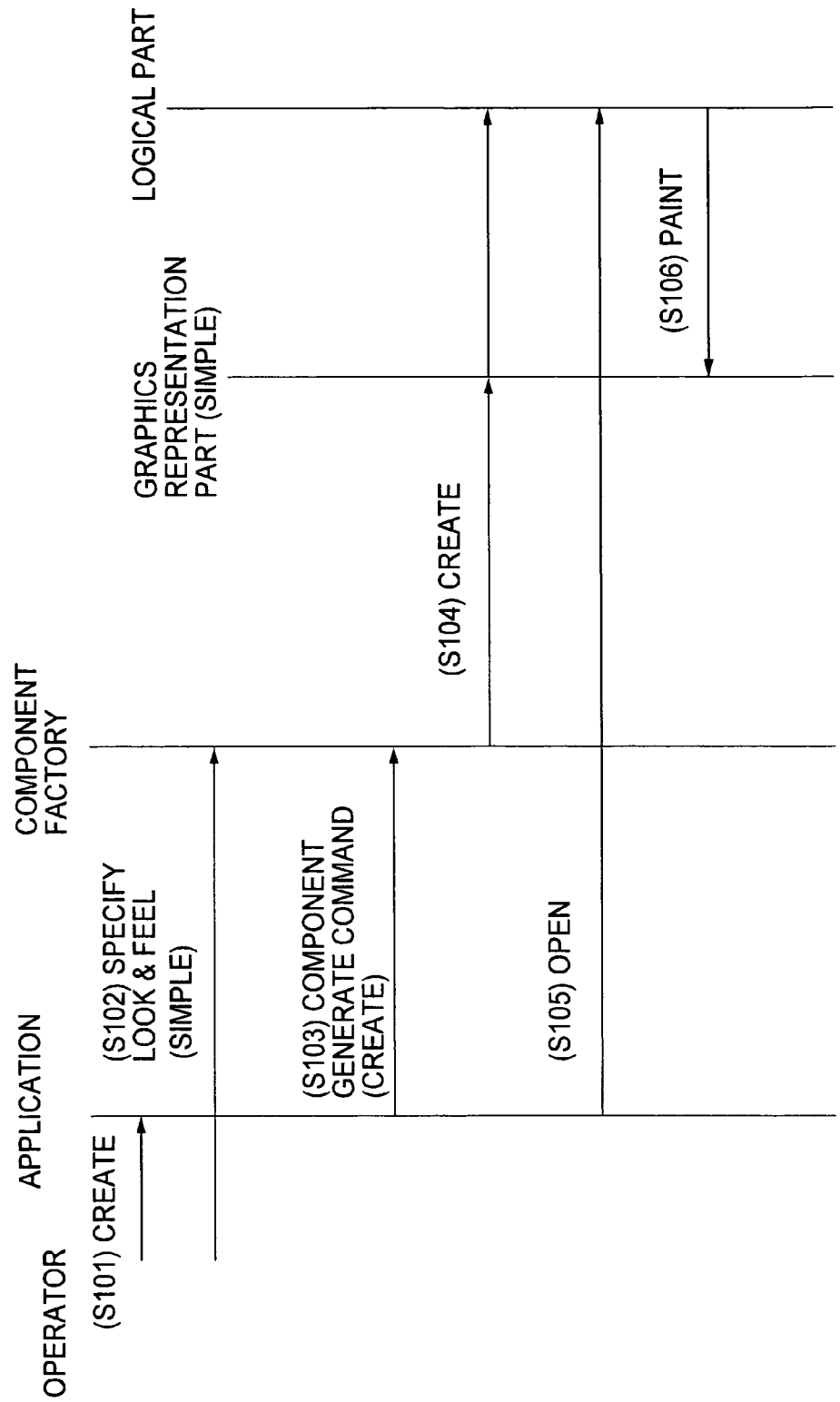
FIG. 3 is a sequence diagram illustrating the processing sequence of a GUI application development supporting apparatus of the present invention.

FIG. 3 is a diagram that shows a processing sequence in which the "Simple" graphics representation component is selected and a GUI component generated. In FIG. 3, there is shown, from the left, each of the processes of the operator, GUI generating application, component factory, graphics representation part and logical part. The processes of the graphics representation part and the logical part correspond to the execution of the programs stored in the components read from the graphics representation component storage section (Simple) 202 and the logical component storage section 201 shown in FIG. 2, and these processes as well as the process of the component factory are executed at the edit processing section 210 in FIG. 2.

First, in step S101, the operator inputs a create command (Create) for a GUI component to the GUI generating application. This create command (Create) for the GUI component is inputted along with data that specifies the kind of the component, such as, for example, "button," "list," "combo box," "radio button," "window" and the like.

Further, in step S102, a "look & feel" specification for specifying the graphics representation is outputted from the operator to the component factory via the application. Here, it is assumed that "Simple" is specified as the "look & feel" specification.

Next, in step S103, a component create command is outputted to the component factory from the application. Identification data that indicates the component kind specified in the previous step S101 is included in this command.

In step S104, the component create command (Create) is outputted from the component factory with respect to the graphics representation part (Simple) and the logical part, and the creation of a component is executed in accordance with the stored programs of the logical part and the graphics representation part.

The processes subsequent to step S105 show a processing sequence in a case where a component is processed by the application, for example as in when an open process command for a "window" as a component is performed. An open process command for a component from the application is handed to the logical part, and based on the execution of the program of the logical part, a paint command is handed to the graphics representation part (Simple). The graphics representation part (Simple) executes paint processing for the component based on the inputted command from the logical part.

Here, since the graphics representation part adopted for component generation is "Simple," the generated component to be displayed on the display, namely buttons and the like, take on a simple configuration in which color settings by paint are done.

Next, a processing sequence in which the "Rich" graphics representation component is selected and a GUI component generated will be described with reference to FIG. 4. As in FIG. 3, from the left, there are shown each of the processes by the operator, GUI generating application, component factory, graphics representation part and logical part. As in FIG. 3, the processes of the graphics representation part and the logical part correspond to the execution of the programs stored in the components read from the graphics representation component storage section (Simple) 202 and the logical component storage section 201 shown in FIG. 2, and these processes as well as the process of the component factory are executed at the edit processing section 210 in FIG. 2.

First, in step S201, the operator inputs a create command (Create) for a GUI component to the GUI generating application. This create command (Create) for the GUI component is inputted along with data that specifies the kind of the component, such as, for example, "button," "list," "combo box," "radio button," "window" and the like.

Further, in step S202, a "look & feel" specification for specifying the graphics representation is outputted from the operator to the component factory via the application. Here, it is assumed that "Rich" is specified as the "look & feel" specification.

Next, in step S203, a component create command is outputted to the component factory from the application. Identification data that indicates the component kind specified in the previous step S201 is included in this command.

In step S204, the component create command (Create) is outputted from the component factory with respect to the graphics representation part (Simple) and the logical part, and the creation of a component is executed in accordance with the stored programs of the logical part and the graphics representation part (Rich).

The processes subsequent to step S205 show a processing sequence in a case where a component is processed by the application, for example as in when an open process command for a "window" as a component is performed. An open process command for a component from the application is handed to the graphics representation part, and animation is executed (S206) based on the execution of an animation program stored in the graphics representation part.

Further, in step S207, the open process command is handed to the logical part, and based on the execution of the program of the logical part, a paint command is handed to the graphics representation part (Simple), and the graphics representation part (Rich) executes paint processing for the component in accordance with the inputted command from the logical part.

Figure 4:
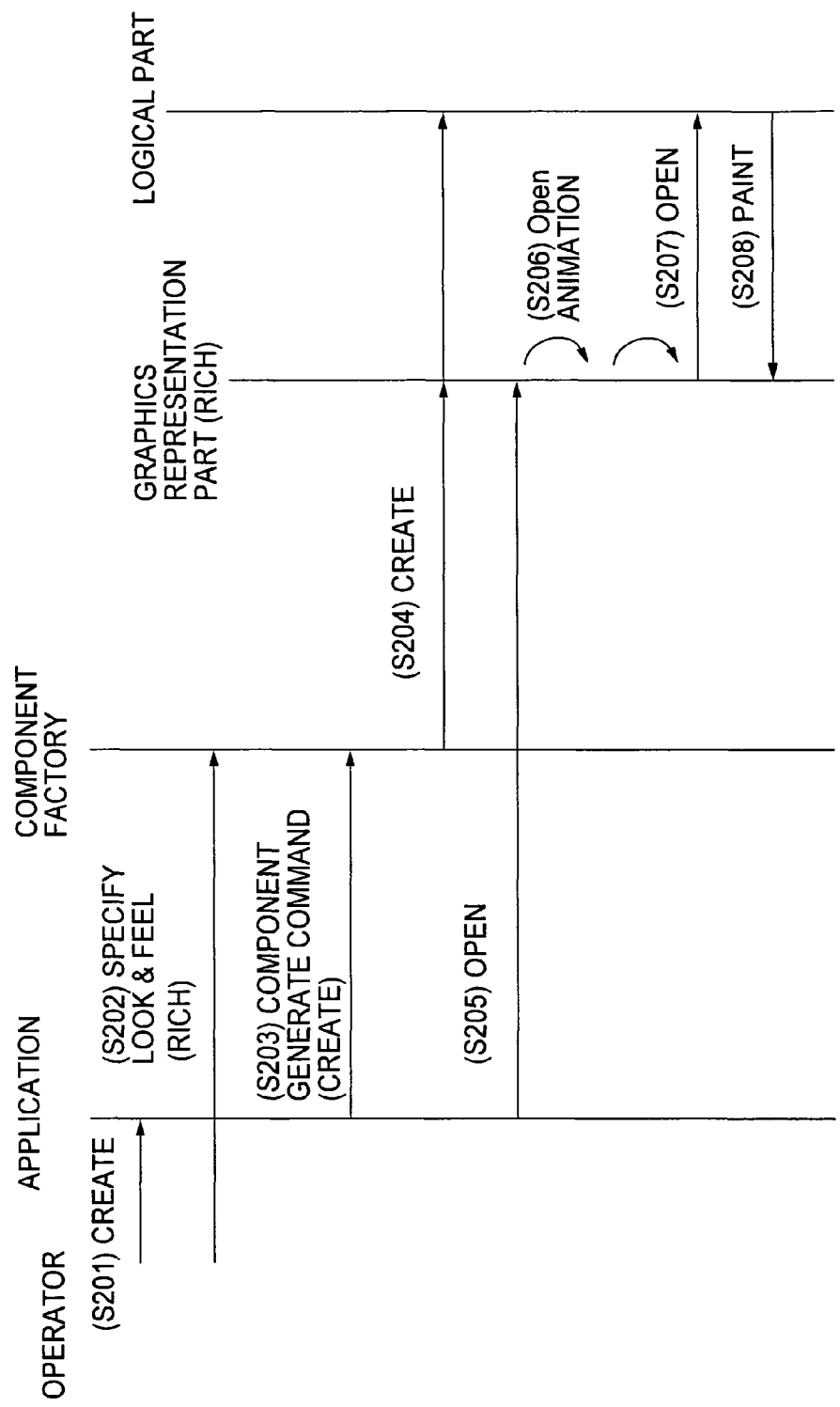
FIG. 4 is a sequence diagram illustrating the processing sequence of a GUI application development supporting apparatus of the present invention.

In the sequence diagram shown in FIG. 4, since the graphics representation part adopted for component generation is "Rich," the generated component to be displayed on the display, namely buttons and the like, take on a configuration in which not only color settings by paint are done, but also animation representation is executed.

[4. File Configuration Example]

A file configuration example for executing such component display as mentioned above will be described.

For example, as files in a case where a "buttcon" component, as an icon having the functionality of a button as an example of a GUI component, is configured as a GUI component, each of the following files, for example, becomes necessary.

Cbuttcon.java: a class for implementing the logical part of the buttcon,

Buttcon.java: a class for implementing the look & feel part as the graphics representation part of the buttcon, buttcon_normal_off.gif: the image when the buttcon is "off,"

buttcon_normal_on.gif: the image when the buttcon is "on,"

buttcon_pushed.gif: the image when the buttcon is being pushed,

CComponentFactory.java: a factory class, which the application uses to create the buttcon;

Application.java: an application for displaying the created buttcon.

A class refers to an executable unit of program in Java.

The directory configuration of each of the files above is shown in FIG. 5. A [customtoolkit] file as a tool kit exists below some GUI application file [application], and in this file are included CButtcon.java: a class for implementing the logical part of the buttcon, CComponentFactory.java: a factory class that the application uses to create the buttcon and further a look & feel file [laf] as graphics representation information.

Buttcon.java: a class for implementing the look & feel part as the graphics representation part of the buttcon, that is, a class corresponding to the graphics representation component described above, is included in the look & feel file [laf]. Further, as image data files [image], each of buttcon_normal_off.gif: the image for when the buttcon is "off," buttcon_normal_on.gif: the image for when the buttcon is "on," and buttcon_pushed.gif: the image for when the buttcon is being pushed is included.

The GUI application program, in accordance with the user's input information, executes a process in which the processing programs and image data included in each of these files are applied. Specifically, both various function executing processes that follow the program of the logical part class as well as various graphics representation processes that follow the program of the graphics representation part class are executed.

[5. Display Example]

Next, with reference to FIG. 6 and FIG. 7, a display processing example for GUI components generated based on a configuration in which the logical part and the graphics representation part of each component are separated will be described.

Figure 6:
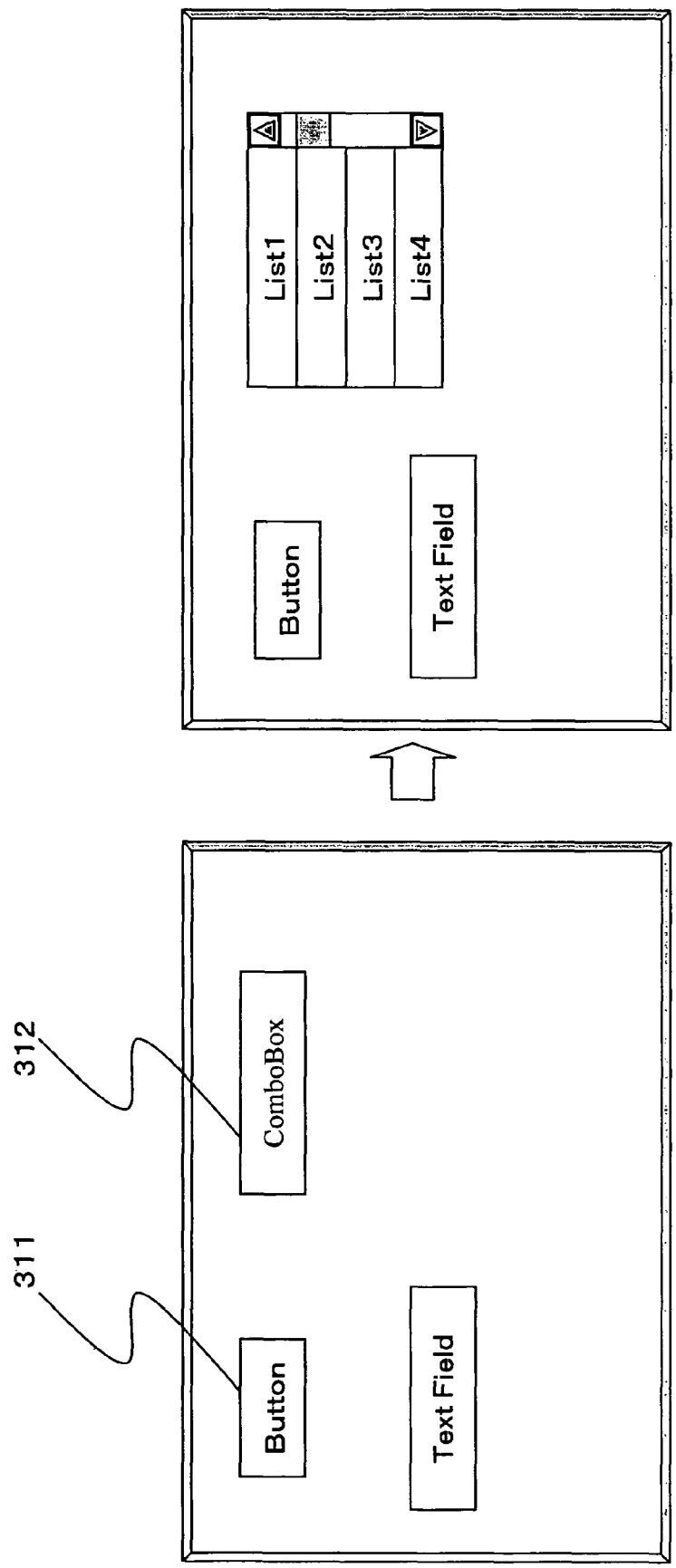
FIG. 6 is a diagram illustrating a display example of a GUI component generated with a GUI application development supporting apparatus of the present invention.

FIG. 6 shows an example in which each component is generated and displayed while applying the graphics representation part (Simple). A description will be given taking a button 311 and a combo box 312 as examples of GUI components.

When the button 311 is manipulated, for example when the button is turned on, turned off, or when focus settings, in other words cursor settings, are carried out, processes based on on and off operations of the button are executed by processes of the logical part of the button component. Further, through, for example, a paint command from the logical part, the graphics representation part (Simple) is executed, and paint processing, that is, a process of changing the displayed color of the button, is carried out.

When the combo box 312 is manipulated, for example when the combo box 312 is opened, closed, etc., processes based on opening and closing operations of the combo box are executed by processes of the logical part of the combo box component. Further, through, for example, a paint command from the logical part, the graphics representation part (Simple) of the combo box component is executed, and paint processing, that is, a process such as changing the displayed color of the combo box, is carried out.

In addition, what kind of graphics representation is to be executed through a process from the operator may be set differently for each GUI component. In other words, by altering the processing program of the graphics representation part (Simple), graphics representation processing that suits each component becomes possible.

Figure 7:
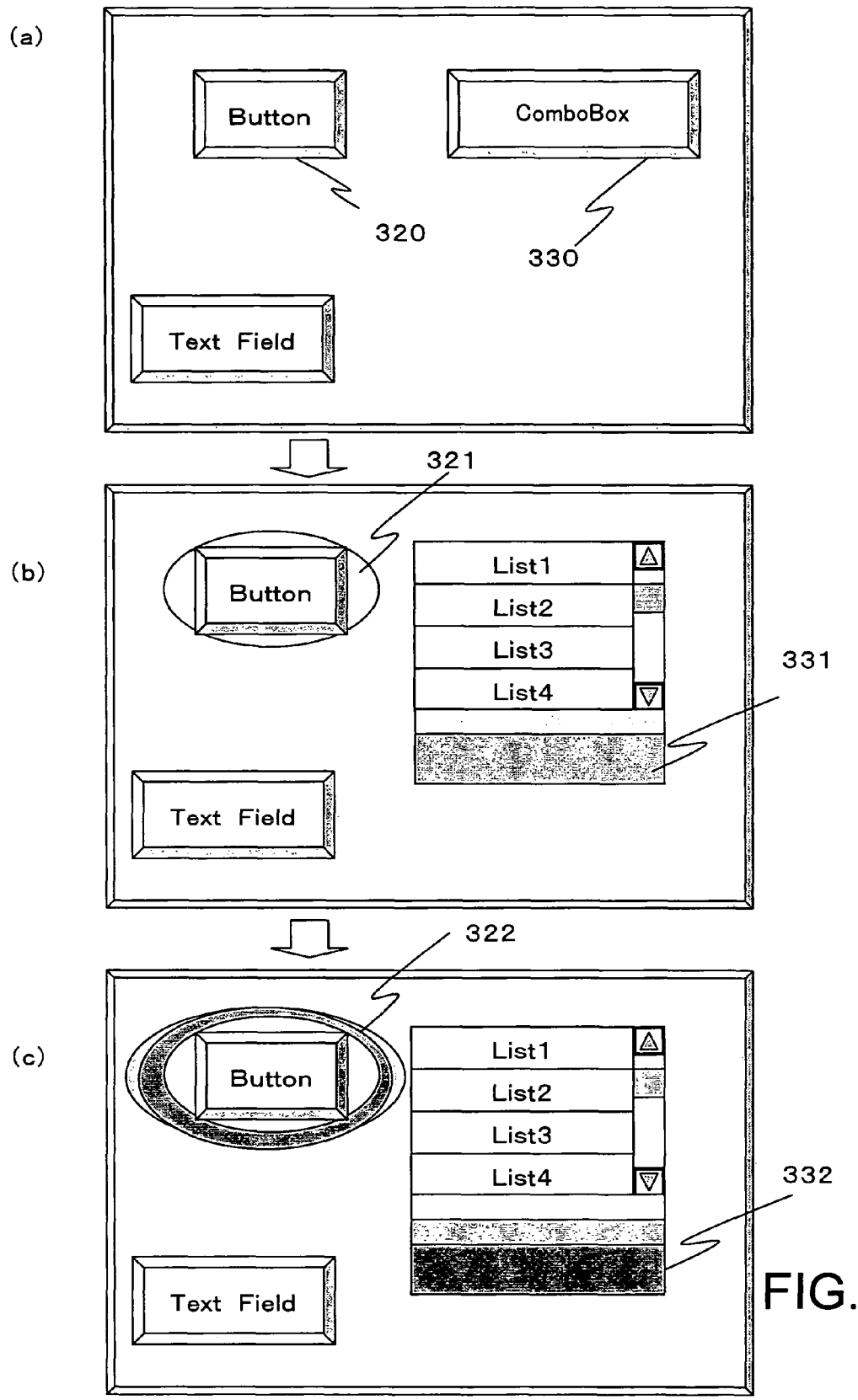
FIG. 7 is a diagram illustrating a display example of a GUI component generated with a GUI application development supporting apparatus of the present invention.

FIG. 7 shows an example in which each component is generated and displayed while applying the graphics representation part (Rich). A description will be given taking a button 320 and a combo box 330 as examples of GUI components.

When the button 320 is manipulated, for example when the button is turned on, turned off, or when focus settings, in other words cursor settings, are carried out, animation 321 and 322 are executed as processes of the graphics representation part (Rich) of the button component in addition to the paint processing described above. Though it is hard to see from the diagram, in (b) and (c), an animation where a ripple propagates around the button is executed. In addition, through processes of the logical part, processes based on on and off operations of the button are executed.

When the combo box 330 is manipulated, for example when the combo box 330 is opened, closed, etc., processes based on opening and closing operations of the combo box are executed by processes of the logical part of the combo box component, while at the same time animations 331 and 332 are executed as processes of the graphics representation part (Rich) of the combo box component. Though it is hard to see from the diagram, in (b) and (c), an animation that is set so that it extends downward from the lower portion of the combo box is executed.

[6. Animation Setting and Executing Process]

Next, a process of setting and executing animation for GUI components, such as windows, buttons, combo boxes, lists and the like, will be described.

Figure 8:
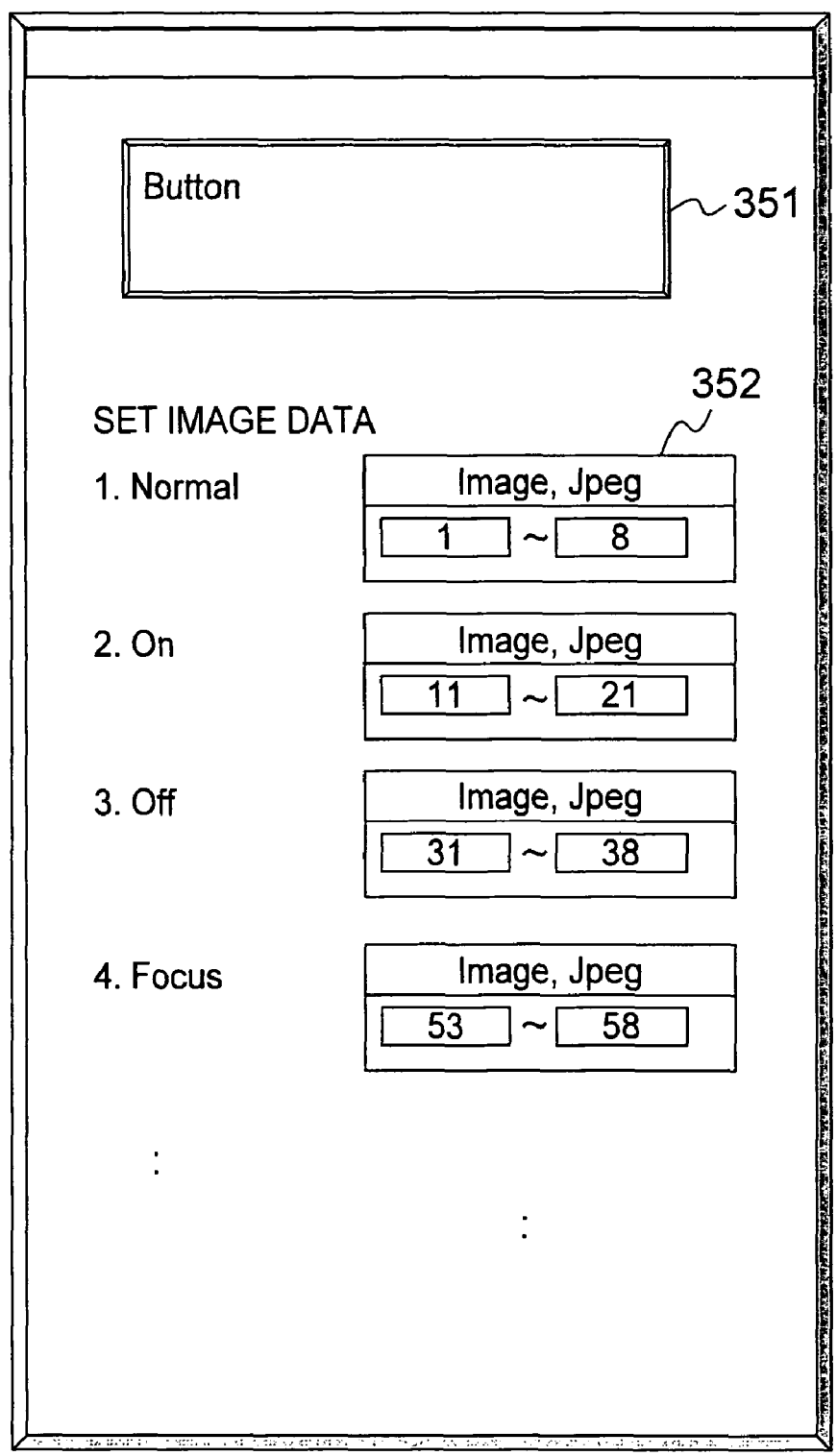
FIG. 8 is a diagram illustrating an example of a process, which is executed with a GUI application development supporting apparatus of the present invention, of setting animation corresponding to the state of each component.

FIG. 8 is a diagram showing a processing screen for setting image data for executing animation with respect to a component. A configuration is adopted where component [Button] is set in a component specifying field 351, an image data setting field 352 is configured therebelow, and the image to be called (jpeg) at each component state, that is under a normal state, or under on, off and focus settings and the like, can be set individually. Focus setting refers to a state where a cursor is set on that component, and the component is in a state where it is capable of operations such as on and off.

For example, when an on process is to be carried out, an animation index method is called and executed in accordance with a program defined for the graphics representation component. Through the execution of the animation index method, Jpeg images 11 through 21 are read from image file [Image], and the image of a button displayed on the GUI based on these plurality of images is displayed in animation. When an off process is to be carried out, Jpeg images 31 through 38 are read from image file [Image], and the image of a button displayed on the GUI based on these plurality of images is displayed in animation.

In the example shown in FIG. 8, there is shown an example having the four states of Normal, On, Off and Focus as component states. However, state definitions are not limited to these, and may be defined as follows, for example, and such a configuration may be adopted where image data is set according to each state.

NORMAL: a normal state

NORMAL DEACTIVATED: a normal state that is not active

FOCUSED: a focused state

FOCUSED DEACTIVATED: a focused state that is not active;

PUSHED: a pushed state

PUSHED DEACTIVATED: a pushed state that is not active

DISABLED: an inoperable state

DISABLE DEACTIVATED: an inoperable state that is not active.

By setting different image data that constitute animation in association with each of the eight states above, it becomes possible for a user to understand the state of a component according to the animation. In addition, a state that is not active refers to cases such as a state where it is displayed in a window that is not subject to operation.

Thus, for each component, individual image files can be set so as to correspond to processes, and it becomes possible to freely set optimal animation representation that corresponds to various processes. In the drawing, there is shown an example where an animation for a button is being set, but, similarly, setting animations that correspond to various processes is possible for other components, too.

For example, various animations are set by having images each individually selected and set from image files for an animation at open, an animation at close and the like for a combo box.

A GUI application development supporting apparatus for executing the animation display setting process described above by setting image data corresponding to the state of each component is realized through the configuration previously described with reference to FIG. 1 and FIG. 2. However, a processing configuration limited to the function for carrying out the process of setting image files according to each component state will be described with reference to the block diagram shown in FIG. 9.

Figure 9:
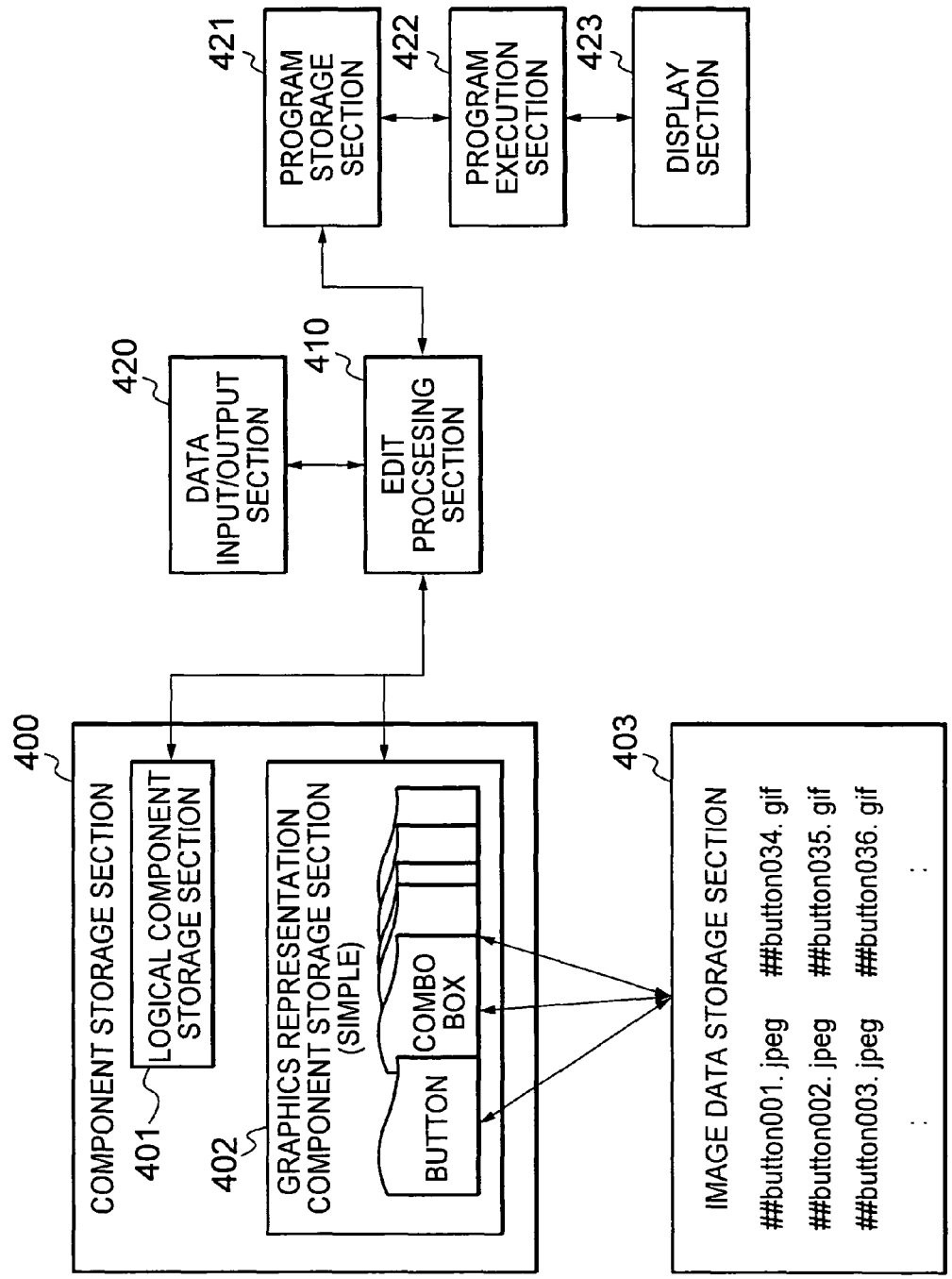
FIG. 9 is a block diagram showing a functional configuration for setting an animation process of a component with a GUI application development supporting apparatus of the present invention.

As shown in FIG. 9, the GUI application development supporting apparatus has a component storage section 400 that stores various components, such as buttons, combo boxes, lists, windows, text boxes and the like, to be set on a screen as a user interface. The component storage section 400 has a logical component storage section 401 as a software program component that defines the processing functions of components, and a graphics representation component storage section 402 as a software program component that defines the graphics representation of components. In addition, graphics representation components may be, as described above, configured as a plurality of different components that execute a plurality of kinds of graphics representations such as Simple, Rich, and the like.

An image data storage section 403 stores image data that are read in accordance with animation index methods that are called by executing a graphics representation class as a program stored in the graphics representation components stored in the graphics representation component storage section 402. Image data are data files of, for example, jpeg, gif and the like, and correspond to each of the graphics representation components stored in the graphics representation component storage section 402.

An operator as a developer of GUI application programs executes various data input with respect to an edit processing section 410 via a data input/output section 420, and constructs a GUI component by setting the function and graphical image of each component, such as a button, combo box or the like.

A creation process execution program for components is, for example, one class (factory class) of a JAVA program. The edit processing section 410 creates various components by executing the factory class. In addition, processing by the edit processing section 410 is, in the case of the hardware configuration shown in FIG. 1, is processing executed under the control of the CPU 101.

In the process of setting animation, as was described with reference to FIG. 8, a process of associating image data to be read according to the state of a component is executed in the edit processing section 410. This process is executed as part of an editing process for the "property," "method," and "event" of a component.

In setting the look, that is, the graphics representation, of a GUI component to be generated, the operator inputs look & feel package specification data with respect to the edit processing section 410 that executes the factory class. In other words, the operator specifies either "Rich" or "Simple," and further, as described with reference to FIG. 8, sets image data to be read according to the state of a component.

In accordance with such settings information, a GUI application program having various components is generated, the generated GUI application program is stored in a program storage section 421, is executed at a program execution section 422, and the generated GUI is displayed on a display section 423.

Figure 10:
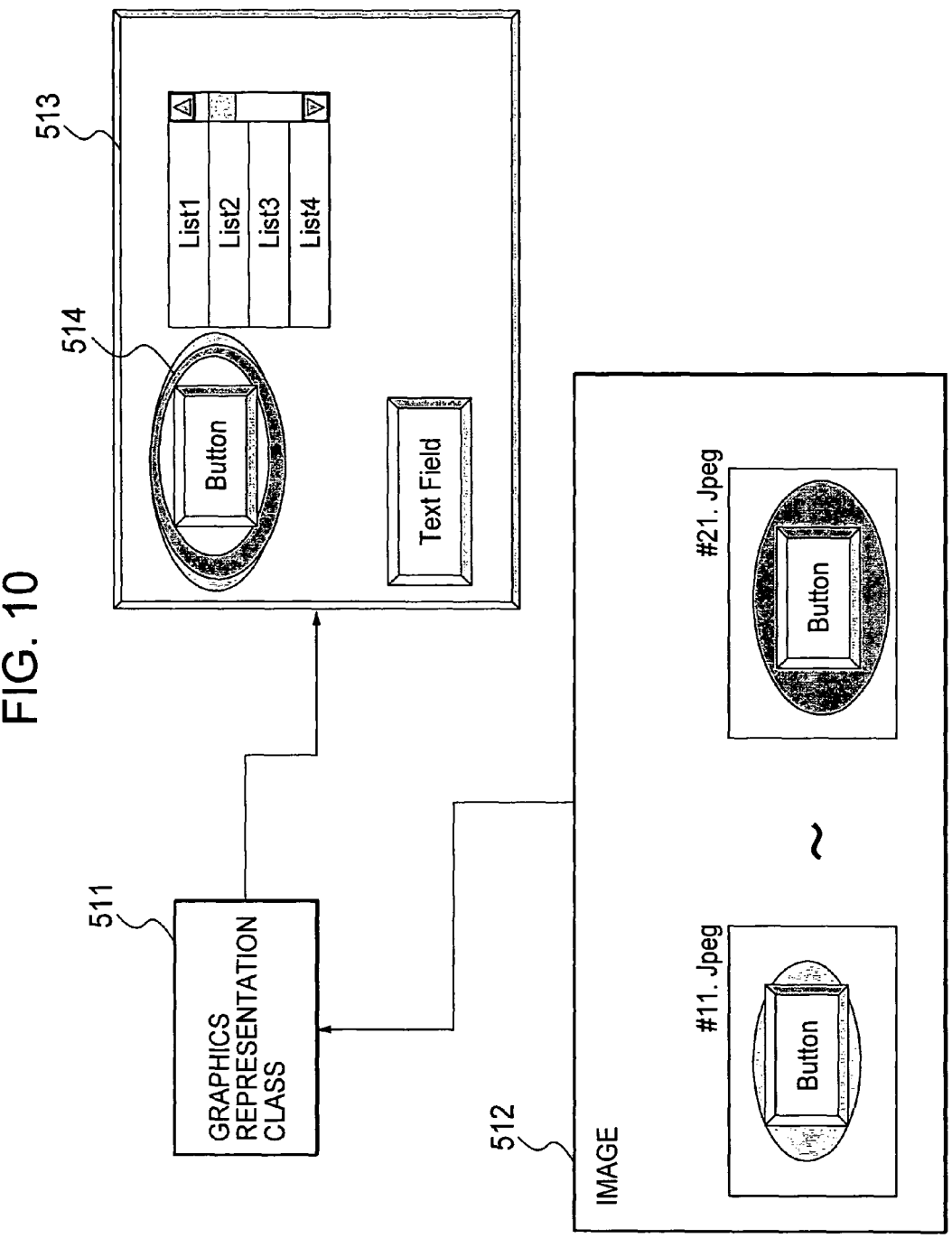
FIG. 10 is a diagram illustrating a process example of a process of executing animation corresponding to the state of a component generated with a GUI application development supporting apparatus of the present invention.

The process at the time of animation execution, that is the process at a GUI display apparatus, will be described with reference to FIG. 10. A display process for animation 514 of a button as a GUI component shown on a display 513 will be described.

For example, if the component is a button component, the animation display process is executed by a graphics representation class 511 of a graphics representation component included in the button component. In accordance with a program defined for the graphics representation class 511, an animation index method is called, the Jpeg images 11 through 21 set in the setting process described previously with reference to FIG. 8 are read from an image file [Image] 512, and the image of a button that is GUI displayed based on these plural images is displayed as the animation 514.

Here, an example is shown where an animation in which a ripple propagates around the button is displayed. The image file [Image] 512 can be stored by securing a partial region of the memory 102, the HDD 111 or some other storage means of the hardware configuration of FIG. 1 and setting it as an image file storage section.

In summarizing the processes described above as an animation display processing method sequence for a GUI component to be displayed on a display, it can be summarized as an execution step comprising:

(1) a class execution step of executing a graphics representation class of a graphics representation component that is associated with the component;

(2) an image reading step of reading pre-set image data from an image file in accordance with an animation index method called in the class execution step; and (3) a step of displaying on a display the image data read in the image reading step.

These processing steps are recorded as a program for executing a GUI application, and are executed in accordance with GUI operations by a user, in other words, animation display is carried out.

In addition, for the animation of components like buttons, various animations can be set easily by altering the called image data. For example, various animations may be set, such as generating concave- or convex-shaped distortions in a button, or changing the color as on and off operations of the button. In addition, it is also possible to adopt a configuration where animation is continuously executed when in a focused state where a cursor is set thereon, and not just at the time of on and off operations. This is realized by calling an animation index method, and reading and executing a focus image file from image data with the overlapping of the cursor position over the button component position as a condition therefore.

In addition, as described with reference to FIG. 2, a plurality of graphics representation components storing different graphics representation process execution programs are prepared in the graphics representation component storage section even for the same component, a button for example, as in Simple, Rich or the like. In the example in FIG. 2, only the two kinds of Simple and Rich are shown, but, further, the setting of a plurality of graphics representation components, such as Rich 1, Rich 2, ... and the like, is possible.

For each of these graphics representation components, it is possible to associate individual read image files that are each different. Even for a button that has the same function, the graphics representation component to be applied is determined by the initial look & feel package specification, and animation that is set in correspondence with that component is displayed. Thus, it becomes possible to carry out various different animation displays in accordance with the look & feel package specification.

[7. Animation Representation of Cursor]

As described above, components such as buttons, combo boxes and the like each have a logical part and a graphics representation part as individual software programs, and further, the graphics representation program has a configuration in which it is possible to select from a plurality of files, such as Simple, Rich and the like.

Next, a graphics representation process for a cursor that is movable in accordance with input from an input means, such as a mouse, a keyboard, arrow keys comprised of up/down/left/right instruction keys, or the like, will be described. In the present description, cursor will be used as an inclusive term for identification display for indicating an instruction position on a window, and will be described as a concept that includes those of, for example, pointers, cursors and the like. In addition, when a cursor is at various component positions, such as buttons, lists, combo boxes and the like, such components will be said to be in a focused state.

As for the graphics representation of a component, as previously described, image files that are individually set according to the various states of the component, such as, to be more specific, for example, if the component is a button, the button component being in a pushed state, a focused state, or the like, are read, and animation display is executed in accordance with the read image files.

The cursor executes animation representation not only when the cursor is located over a specific component, in other words when the component is focused, but also while moving between components, for example, when the cursor is moved from one button component to another button component.

The process for setting these various animations according to the state of the cursor or the component located where the cursor is set can be executed through a process substantially similar to the previously described process for setting an image file for each of the component states, and a GUI application development supporting apparatus that executes this setting process is realized through the configuration previously described with reference to FIG. 1 and FIG. 2. However, a processing configuration limited to the function for carrying out the process of setting image files according to the cursor will be described with reference to the block diagram shown in FIG. 11.

Figure 11:
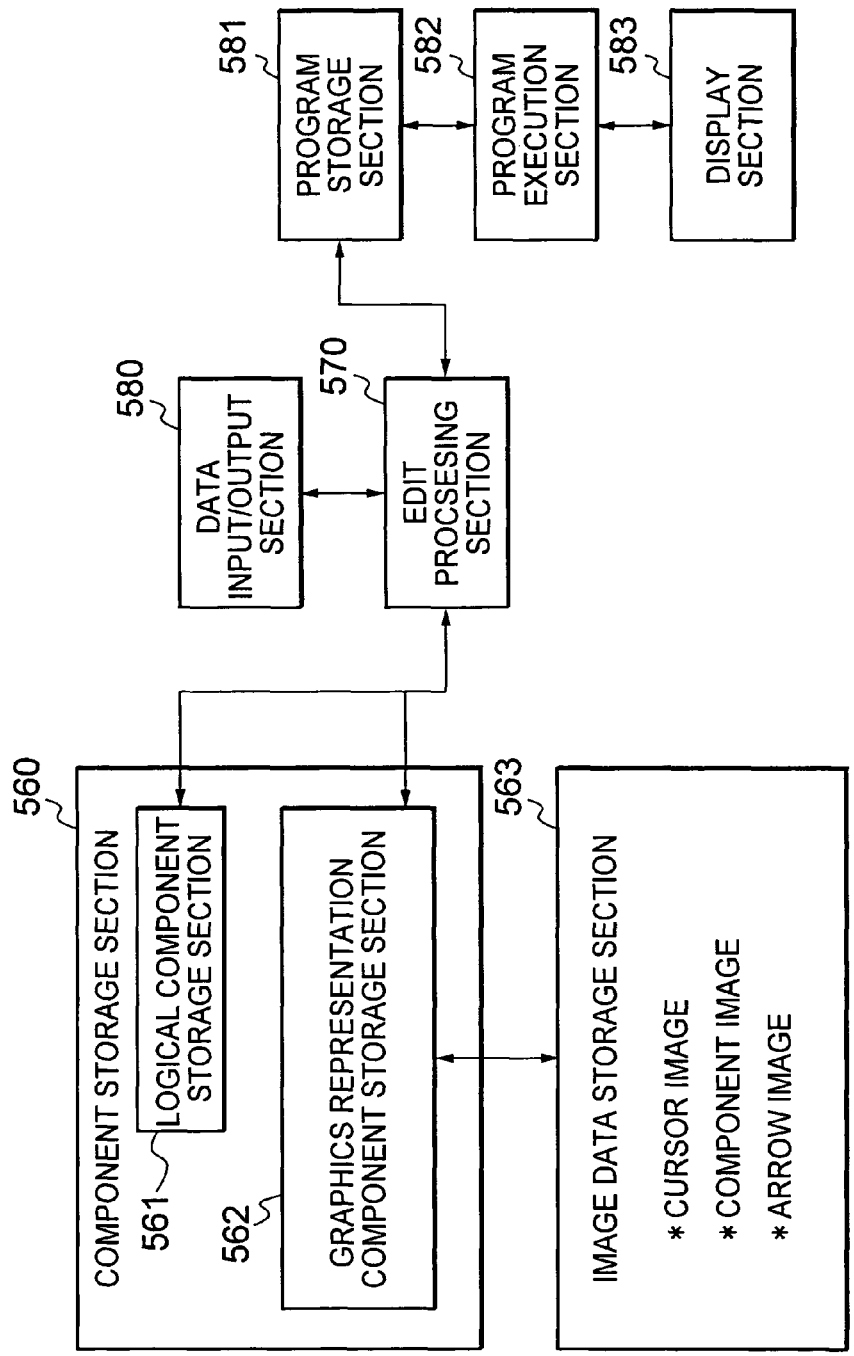
FIG. 11 is a block diagram showing a configuration that performs an image data setting processing function corresponding to a cursor in a GUI application development supporting apparatus of the present invention.

As shown in FIG. 11, the GUI application development supporting apparatus has a component storage section 560 that stores various components, such as buttons, combo boxes, lists, windows, text boxes and the like, to be set on a screen as a user interface. The component storage section 560 has a logical component storage section 561 and a graphics representation component storage section 562. The graphics representation component storage section 562 contains a graphics representation program file corresponding to the cursor that stores a program related to graphics representation for the cursor or a component on which the cursor is set.

An image data storage section 563 is a storage section that stores animation image data that is read in accordance with the execution of a graphics representation program. The image data storage section 563 contains cursor images, images for when the cursor is set on a component, in other words images for during focus settings, and further, arrow display images for arrow displaying a direction in which the cursor set on a component can move, which will be described later. Image data are, for example, image data files, such as jpeg, gif and the like.

An operator as a developer of GUI application programs executes the inputting of various data, commands and parameters with respect to an edit processing section 570 via a data input/output section 580, and executes a process of associating image data to be read according to the state of the cursor or of a component located where the cursor is set.

At the edit processing section 570, a process of setting, as cursor control programs, a focus navigator that executes a search process by a search engine based on cursor move instruction input information and determines a cursor move destination, and a focus manager that executes a move process of the cursor in accordance with the cursor move destination instruction information determined by the focus navigator is executed, and further, a process of setting a cursor move destination selection algorithm that selects a single cursor move destination based on the cursor move instruction input information is executed with respect to the focus navigator. Details of the focus navigator and the focus manager will be described later.

In addition, at the edit processing section 570, a process of associating, with respect to a focused state component in a state where the cursor is set, an image having directional information indicating a direction in which the cursor can move is executed. The processes at the edit processing section 570 are processes that are executed, in the hardware configuration diagram in FIG. 1, under the control of the CPU 101.

According to such settings information, a GUI application program having various components is generated, the generated GUI application program is stored in a program storage section 581 and executed at a program execution section 582, and the generated GUI is displayed on a display section 583.

Figure 12:
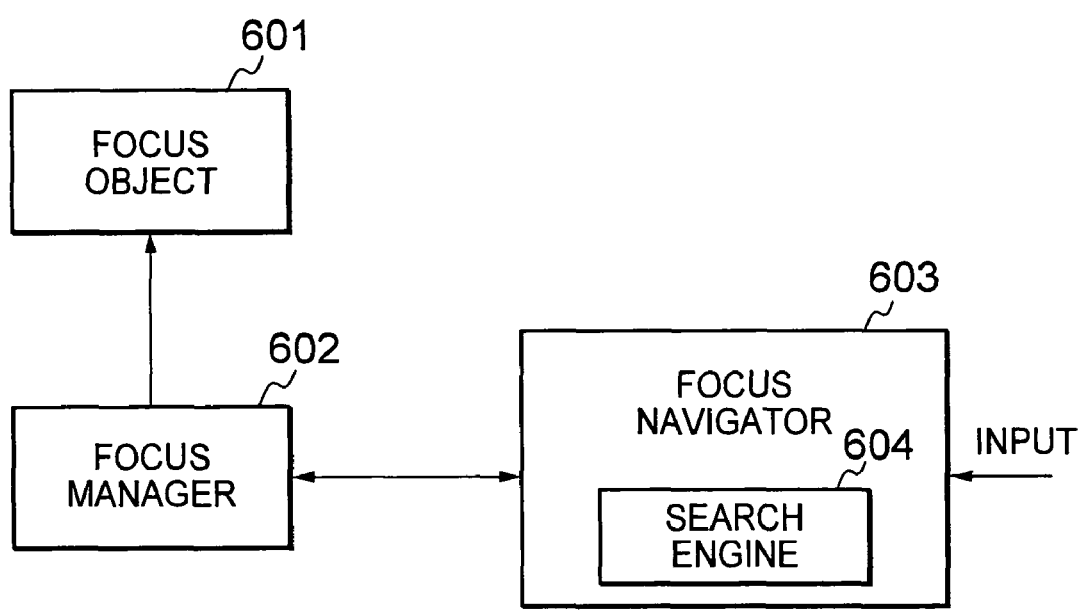
FIG. 12 is a block diagram showing a configuration that performs a process of displaying image data corresponding to cursor movement or a cursor in a GUI display apparatus of the present invention.

Next, a configuration for executing an animation representation process of the cursor in accordance with the generated GUI application program, in other words a functional configuration for carrying out processes by GUI-equipped devices, such as information appliances and the like, or GUI display apparatuses will be described with reference to the block diagram in FIG. 12.

A focus object 601 is a program file that has a program in which is described the animation representation for the cursor or the location of the cursor. A focus manager 602 is a management program that executes a move process of the cursor in accordance with move destination instruction information of the cursor that is inputted from a focus navigator 603, and that, in addition, executes such processes as notifying an animation execution command to the focus object 601. The focus navigator 603 has a search engine 604, and based on user input from an input section, such as a mouse, arrow keys and the like, executes a search process by the search engine 604, determines a move destination of the cursor, and outputs the determined move destination information of the cursor and the like to the focus manager 602.

The focus navigator 603 executes a cursor move destination determination process in accordance with a cursor move destination selection algorithm that selects a single cursor move destination based on cursor move instruction input information. The cursor move instruction input information is, for example, move direction instruction information in one of the four directions of up/down/left/right, and the cursor move destination selection algorithm executed by the focus navigator 603 is, for example, an algorithm that determines a single component from a plurality of components existing in the direction corresponding to the move direction instruction information to be the cursor move destination.

Figure 13:
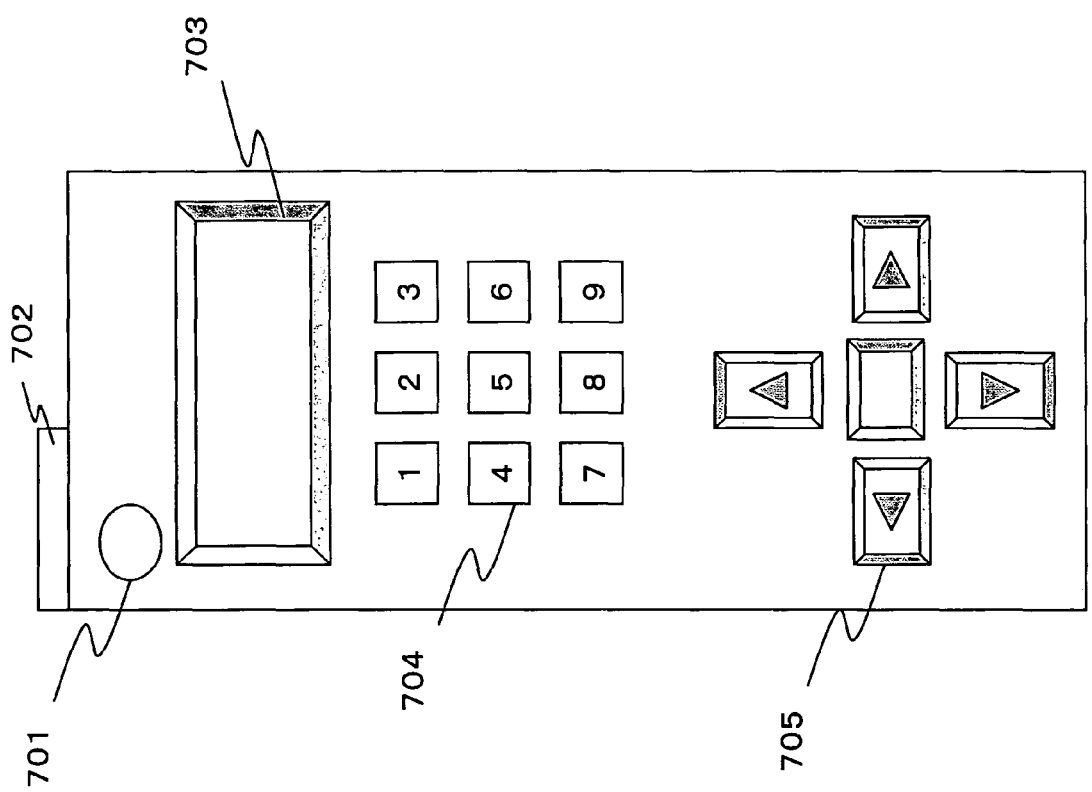
FIG. 13 is a diagram showing a configuration example of a remote control that comes with a GUI-equipped device and which is capable of instructing cursor movements.

As a user input device for specifying the cursor's movement, a remote control having an output section, such as infrared and the like, for example, is usable. A configuration example of a remote control is shown in FIG. 13. The controller shown in FIG. 13 includes a power switch 701 for a device being controlled having a GUI, an output section 702 comprised of an infrared output means or the like, a display 703, input buttons 704 for carrying out various specifications, and arrow keys 705 that have the function of instructing up/down/left/right-ward moves of the cursor. The controller shown in FIG. 13 is only one example, and various configurations that suit the functions of the GUI-equipped device are possible. In addition, the input section is not limited to a remote control, and may be an input section that is integrated into the GUI-equipped device itself.

The cursor move processing sequence accompanying animation representation will be described. When a user input from the input section, such as arrow keys and the like, is generated, the focus navigator 603 receives the input information. The focus navigator 603 executes a move destination search process, which applies the search engine 604, based on the input information.

Based on the search result by the search engine 604, the focus navigator 603 determines a move destination component. For the move destination determination process mode, various modes may be applied, specific examples of which will be described later.

Once the move destination is determined, the focus navigator 603 outputs a move destination instruction to the focus manager 602, and the focus manager 602 executes a cursor move process towards the move destination. Further, the focus manager 602 outputs an animation execution command to the focus object 601, and the focus object 601 runs an animation processing program, in other words, a read process and a display process of image files that are set so as to correspond to the cursor. Through this series of processes, a cursor move process in which animation representation is carried out is performed.

Figure 14:
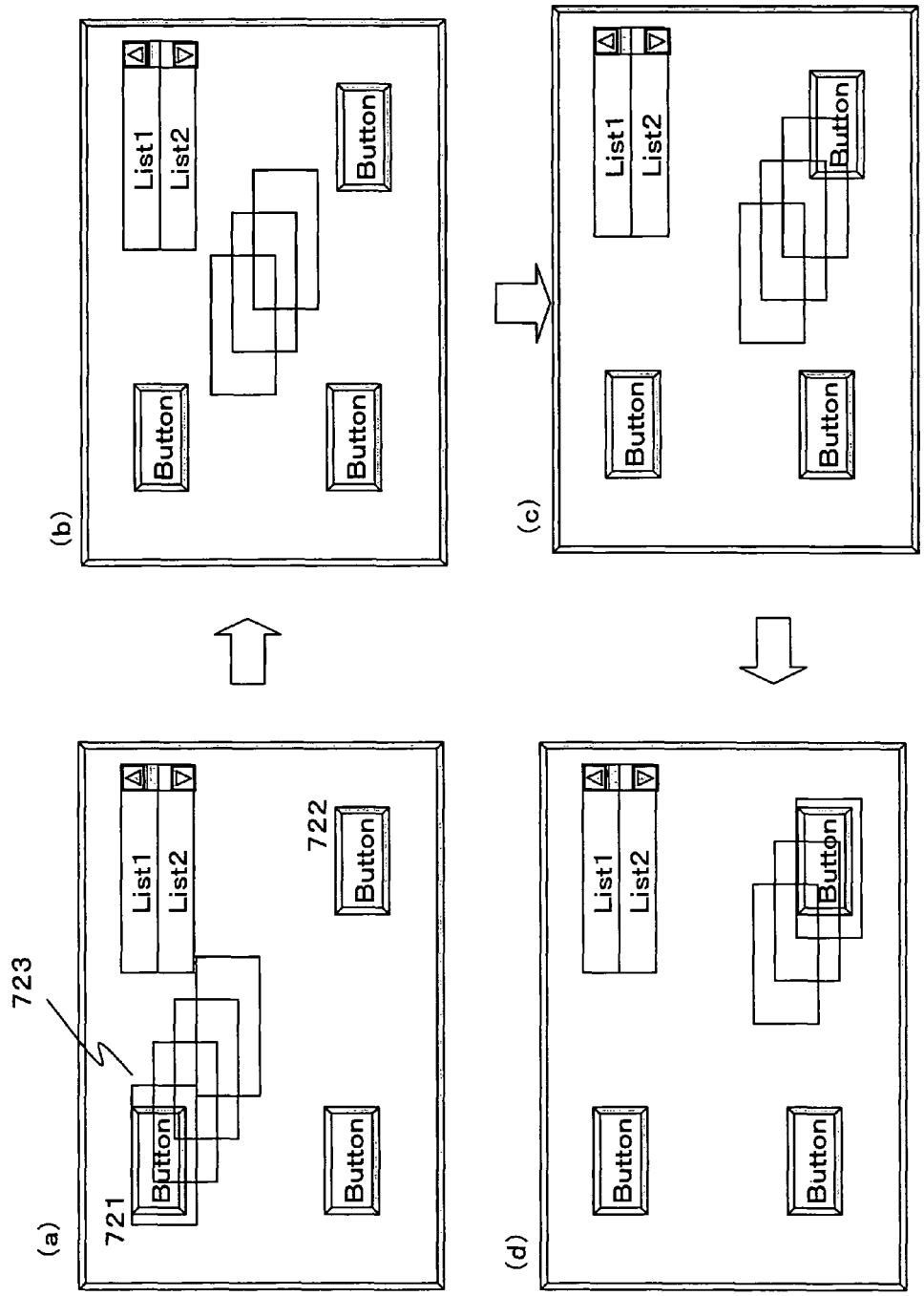
FIG. 14 is a diagram showing an example of animation display that accompanies a cursor movement on a GUI displaying display.

An animation representation example during cursor movement is shown in FIG. 14. As described with reference to FIG. 12, the animation execution process is executed based on the reading of image data by the focus object. The processing example in FIG. 14 shows a series ((a) through (d)) of display examples on a display starting from a button 721 displayed on a display, the cursor moving to a button 722, the focused state of the button 721 being terminated, and up to the button 722 entering a focused state.

In the example in FIG. 14, animation representation is executed where rectangular frames much like the shape of the button are sequentially generated towards the direction in which the cursor moves, and where, along with the cursor movement, the trailing rectangular frames disappear. These animation representations are ones that are performed by virtue of image data read by the focus object. The setting of these image data is an animation display based on image data that are set by a process that is similar to the process of setting image data according to the state of a component that was previously described with reference to FIG. 8.

Figure 15:
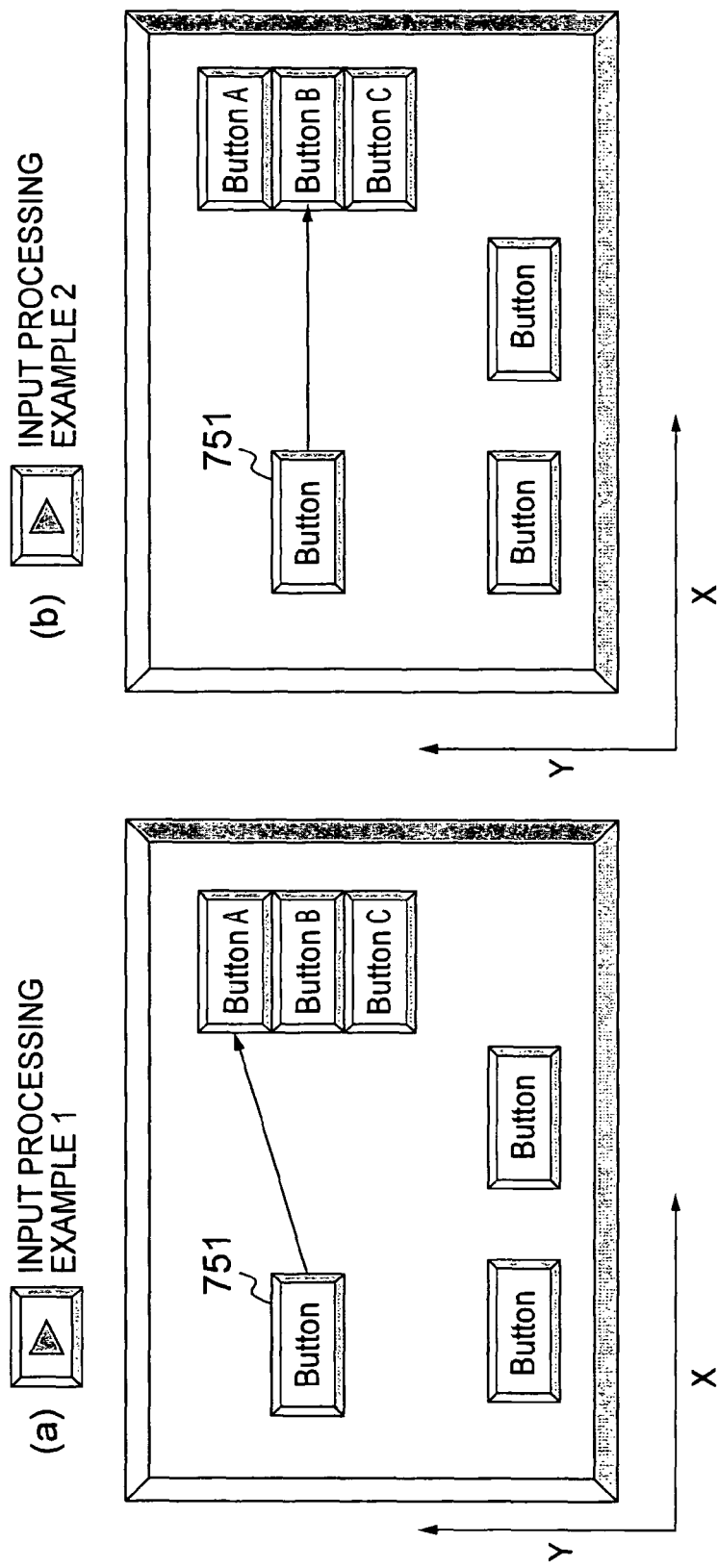
FIG. 15 is a diagram showing an example of a cursor movement between components on a GUI displaying display.

The focus navigator 603 receives input by a remote control such as the one shown in FIG. 13 or by arrow keys as an input section of the device itself, and determines a cursor move destination by a search process that applies the search engine 604 based on the input information. An example of a process for determining the cursor move destination will be described with reference to FIG. 15. FIG. 15 shows two different process examples (a) and (b). Both show a process example where a user input that specifies a rightward movement is generated while a cursor is located at a button 751 and the button 751 is in a focused state.

FIG. 15(a) is an example where, of the buttons A through C located to the right of the button 751, the top-most button A is determined as the move destination, and FIG. 15(b) is an example where, of the buttons A through C located to the right of the button 751, the middle button B is determined as the move destination.

FIG. 15(a) is a process in which the top-most button is selected from among the buttons that are located to the right of the button 751, and this process is executed by the focus navigator 603 based on coordinate information (X, Y) of each button component. For example, a process of selecting buttons located to the right of the button 751 by a process of comparing the X coordinate of the button 751 and the X coordinate of each button component is executed, and, further, of the selected button components, the one with the greatest Y coordinate is determined as the cursor move destination.

FIG. 15(b) is a process in which the button that is closest in distance to the button 751 is selected from among the buttons that are located to the right of the button 751, and this process is a move destination selection process based on a process of calculating the distance from the button 751 based on the coordinate information (X, Y) of each button component and a process of comparing the calculated results by the focus navigator 603.

How the move destination is determined based on the user input information is dependent upon programs executed by the focus navigator 603 and the search engine 604, and through program settings, the move destination determination algorithm based on the user input information can be set in a variety of ways. For example, as described above, it may be made an algorithm that selects, of a plurality of components that exist in the direction corresponding to the move direction instruction information, the component that is closest in distance from the component on which the cursor is currently set, or an algorithm may be set where, of a plurality of components that exist in the direction corresponding to the move direction instruction information, the component at the furthest end is selected. These algorithm setting processes are executed at the edit processing section 570 (see FIG. 11) in the GUI application development supporting apparatus.

In addition, it is also possible to set in advance move destinations that correspond to input information in the logical components of such components as buttons and the like, and in this case, the move destination search process by the focus navigator 603 is not executed, and the move destination is determined in accordance with the move destination settings information that a component has.

Thus, the focus navigator executes a move destination determination process that applies a search engine based on input information, but, further, makes it possible to acquire information regarding directions in which each component can move, and to display, with respect to a component that has entered a focused state, such graphic images as arrows and the like that indicate directions in which the cursor is able to move. This image display processing program can be set in a graphics representation component corresponding to a component as described previously, or as a focus object corresponding to the cursor.

Examples of displaying arrows are shown in FIG. 16. In the display example of (a), components to which a cursor is able to move from a button component 781 on which the cursor is set and which is in a focused state exist in the four directions of up/down/left/right. For a component in such a state, arrows that indicate the fact that there exist movable components in the four directions of up/down/left/right are displayed. In (b), components to which the cursor is able to move from a button component 782 in a focused state exist in the two directions of up and right. For a component in such a state, arrows that indicate the fact that there exist movable components in the two directions of up and right are displayed.

In (c), a component to which the cursor is able to move exists only in the downward direction with respect to a button component 783 in a focused state. For a component in such a state, an arrow is displayed only in the downward direction. In (d), a component to which the cursor is able to move exists only in the upward direction with respect to a button component 784 in a focused state. For a component in such a state, an arrow is displayed only in the upward direction.

Figure 17:
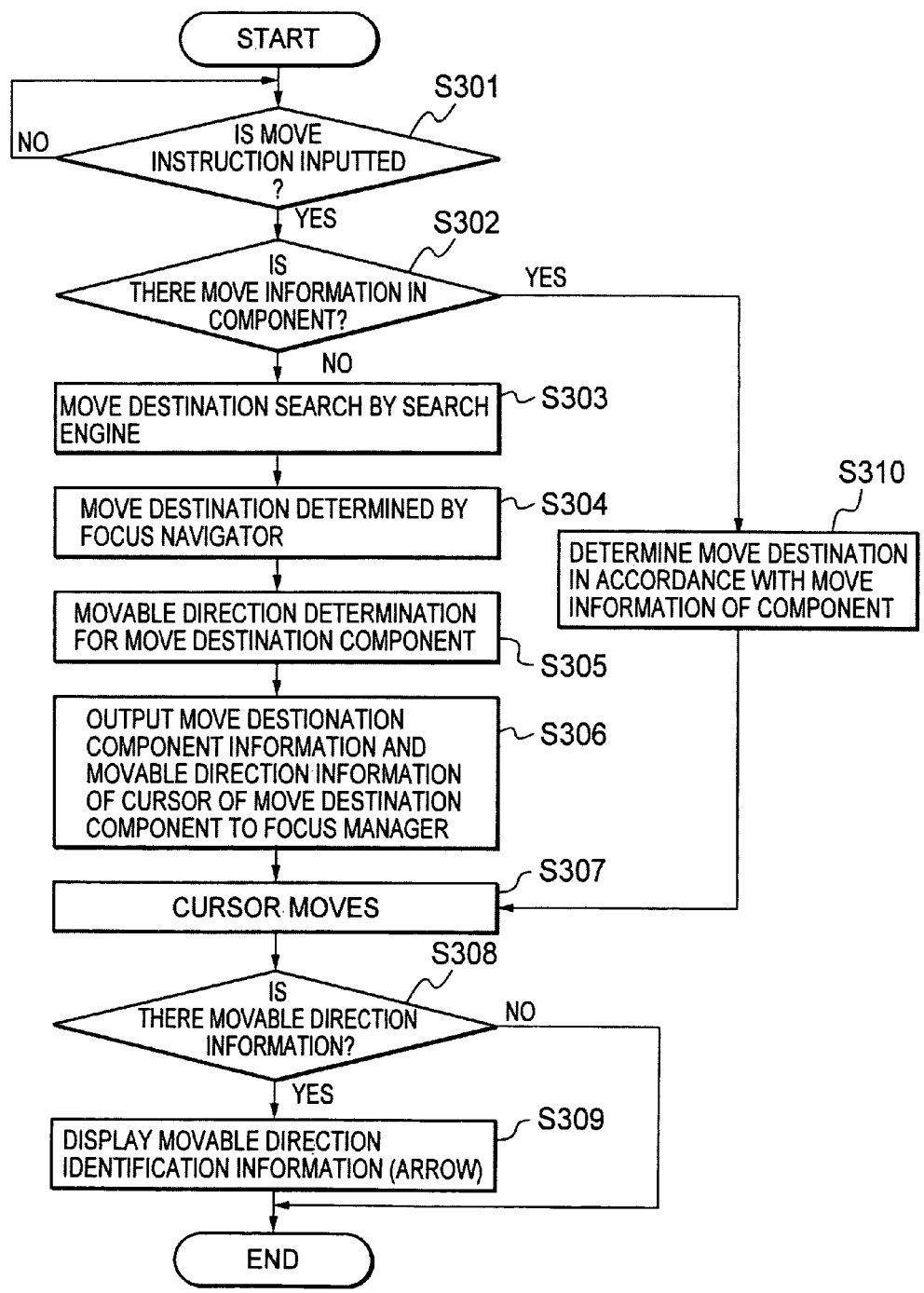
FIG. 17 is a diagram showing a flowchart illustrating a procedure for determining a move destination and for displaying movable direction information in a cursor move process.

Move destination determination and movable direction information display procedures in a cursor move process will be described with reference to the flow shown in FIG. 17. First, in step S301, it is determined whether there has been any input from an input section, such as arrow keys and the like, and if it is determined that there has been an input, the process proceeds to step S302, and it is determined whether or not a component at the cursor's present location has move information representing move destination instruction, for example, whether or not move destination component information is contained in the logical part file of the component. If the information is present, the process proceeds to step S310, the move destination is determined in accordance with the move information, and in step S307, a cursor movement is executed with respect to the determined move destination.

If, in step S302, it is determined that the component in a focused state does not have information representing a move destination instruction, the process proceeds to step S303, a move destination search by a search engine based on user input information is executed, and in step S304, a focus navigator determines the move destination based on the search result by the search engine. Further, in step S305, the focus navigator acquires cursor movable direction information of a move destination component based on component location information in the surrounding four directions of the move destination component.

In step S306, the move destination information determined by the focus navigator and the movable direction information of the move destination component are handed to the focus manager, and in step S307, a cursor move process with respect to the move destination is executed.

In step S308, it is determined whether or not the focus manager has received from the focus navigator the cursor movable direction information of the move destination component, and if not received, the process is terminated, whereas if received, a command for executing a display process for identification information (for example, arrows) based on movable direction information is outputted to a focus object, and the focus object executes an animation of arrow display in accordance with the inputted command.

In other words, the focus object selects image data in accordance with the movable direction information inputted from the focus manager, and executes, for example, an animation display comprised of images where arrows are set in movable directions, which was previously described with reference to FIG. 16.

[8. GUI Display Apparatus Configuration Example]

Next, a configuration example of an apparatus, such as an information appliance, having a graphical user interface (GUI) that executes various display processes that are in line with the description above will be described with reference to FIG. 18.

As GUI-equipped devices, various household devices and communications devices come to mind. The apparatus configuration example shown in FIG. 18 shows one such example, and shows a GUI display apparatus configuration example that has a configuration where a moving image can be played by receiving it via a network or by reading it from a storage medium.

Figure 18:
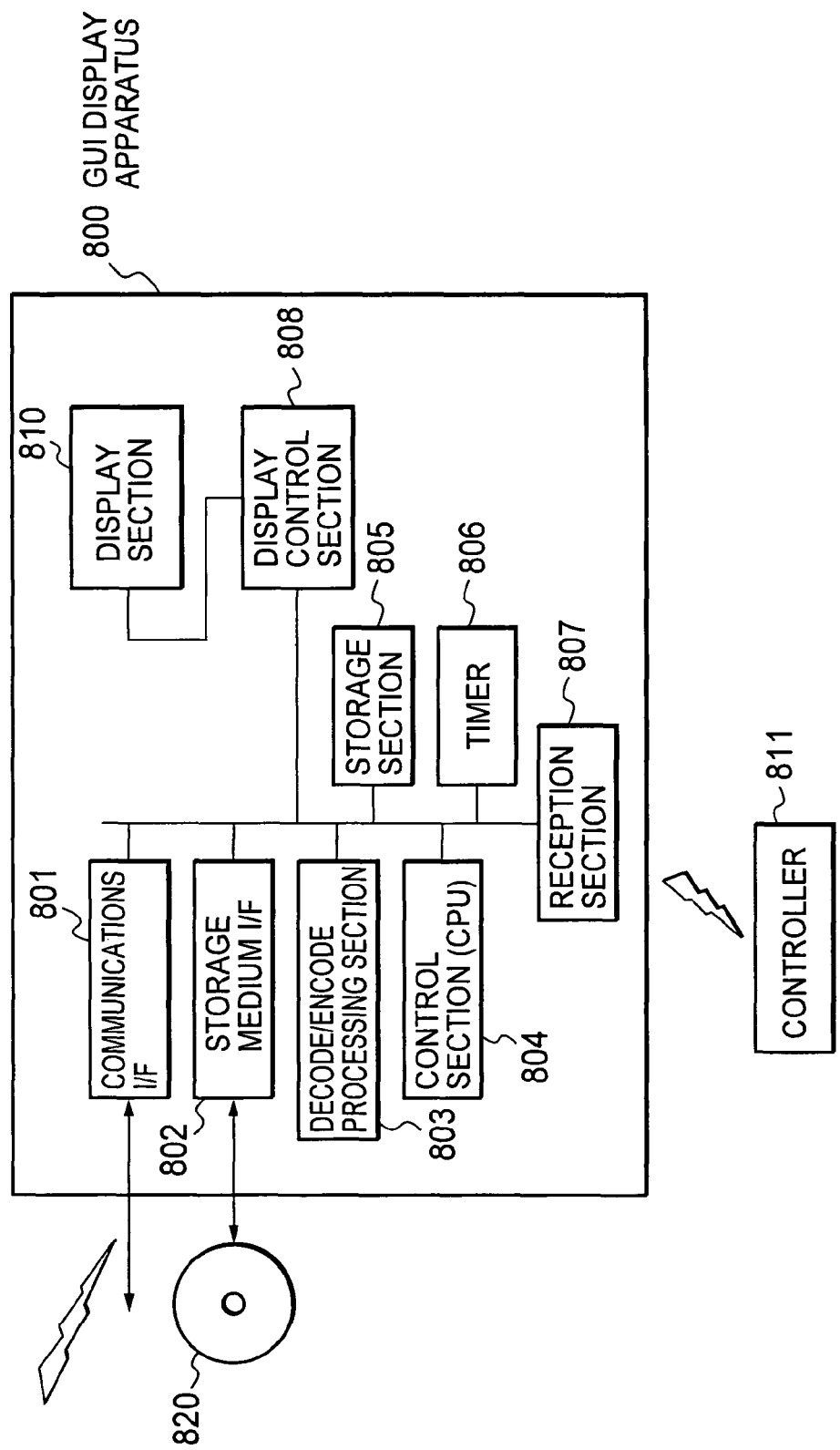
FIG. 18 is a block diagram showing a configuration example of a GUI display apparatus.

A GUI display apparatus 800 shown in FIG. 18 includes a communications interface 801 for receiving Internet-distributed data, broadcast data or the like, and receives HTML documents, movie contents and the like from data distribution sites. In addition, a storage medium interface 802 is a data transfer interface for such various storage media 820 as DVDs, flash memories and the like, and is an interface for inputting and outputting such various contents as moving image data and the like between the storage media 820 and the data processing apparatus 800.

When contents sent from an image distribution site or contents stored on the recording media 820 are encoded, they are displayed on a display apparatus 810 under the control of a display control section 808 after a decoding process is executed at a decode/encode processing section 803.

On the other hand, various commands by the user or the previously described cursor move instruction information are inputted from a controller 811, are received by a reception section 807, and are outputted to a control section (CPU) 804. The control section 804 executes various processes in accordance with the previously described logical component, graphics representation component and the like that correspond to each component. In addition, a focus management process, in other words a cursor move destination component determination process accompanying a cursor movement is executed. Further, an animation displaying process comprised of image data that indicate a movable direction with, for example, arrows is executed in accordance with the focus object.

The storage section in the GUI display apparatus 800 is a storage section that is used for the storage of received data, for the storage of various processing programs, for the storage of preset display image programs, as a storage area as a work area of the CPU 804 or the like, and is comprised of RAM, ROM and the like. A timer 806 is used for measuring the running time of the various programs in GUI processing.

The present invention has been described above in detail with reference to specific embodiments. However, it should be obvious that it is possible for those skilled in the art to make modifications and substitutions to these embodiments without departing from the scope of the present invention. In other words, the present invention has been disclosed in the form of examples, which are not to be considered restrictive. In determining the scope of the present invention, the claims described should be taken into consideration.

In addition, the series of processes described in this specification can be executed through hardware, software, or a composite configuration of both. In executing the processes through software, a program in which the processing sequence is recorded may be installed to a memory within a computer that is incorporated into dedicated hardware and executed, or the program may be installed to a general-purpose computer that is capable of executing various processes and executed.

For example, the program may be recorded in advance on a hard disk or ROM (Read Only Memory) as recording media. Alternatively, the program may be temporarily or permanently stored (recorded) on removable recording media, such as flexible disks, CD-ROMs (Compact Disc Read Only Memory), MO (Magneto Optical) disks, DVDs (Digital Versatile Disc), magnetic disks, semiconductor memories and the like. Such removable recording media may be provided as so-called packaged software.

In addition, besides being installed to a computer from such removable recording media described above, the program may be transferred wirelessly to a computer from a download site, or may be transferred by wire to a computer via such networks as a LAN (Local Area Network) and the Internet, and the computer may receive the program thus transferred, and install it to a recording medium such as a built-in hard disk or the like.

In addition, the various processes described in the specification may not only be executed chronologically as described, but also may be executed in a parallel manner or individually depending on the processing capability of the apparatus that executes the processes or as required. In addition, system as used in the present specification refers to a logical aggregate configuration of a plurality of apparatuses, and is not limited to one in which each constituent apparatus resides in the same body.

INDUSTRIAL APPLICABILITY

As described above, since a GUI application development supporting apparatus of the present invention is given a configuration where it is comprised of a graphics representation program file that stores a program related to graphics representation for a cursor or a component on which the cursor is set, an image storage section that stores animation image data that can be read in accordance with the execution of a graphics representation program, and an edit processing section that executes a process of associating image data to be read at the time of execution of the graphics representation program according to the state of the cursor or of the component located at the position of the cursor, and where it is made possible to, at the edit processing section, set different read image data in association with each of the states of the cursor or of the component located where the cursor is set, it becomes possible to freely set animation that suits the cursor state, and it becomes possible to carry out with ease an optimal animation setting process corresponding to a cursor that is adapted to a GUI-equipped device.

Further, according to a configuration of the present invention, because it is made possible to execute, for a focused state component in a state where a cursor is set, a process of associating an animation having directional information indicating a direction in which the cursor can move, it becomes possible to provide a GUI that is easy to operate for a user.

Further, because a configuration is adopted where the logical part and the graphics representation part of a component are configured separately, a GUI component based on the logical part and the graphics representation part is generated, and the graphics representation part is given an animation execution function based on images corresponding to the state of the cursor or the component, it becomes possible to set or alter with ease the mode of animation for the component or the cursor through a process that is independent of the logical part.

Further, for a GUI display apparatus of the present invention, since a configuration is adopted where a search process by a search engine based on cursor move instruction input information is executed, a cursor move destination is determined, and a move process of the cursor is executed in accordance with the determined cursor move destination instruction information, while at the same time an animation display process according to the state, which accompanies a cursor movement, of the cursor or of the GUI component on which the cursor is set, a highly visually effective GUI with which move conditions of the cursor and the component on which the cursor is set can be identified readily is realized.

Further, for a GUI display apparatus of the present invention, since a configuration is adopted where an animation display process comprised of images having directional information indicating a direction in which the cursor is able to move is executed, a GUI that is easy to operate for a user is realized.

The invention claimed is:

1. An apparatus that carries out an animation representation for a cursor or a Graphical User Interface (GUI) component on which the cursor is set, the apparatus comprising:
  a display;
  a focus navigator that executes a cursor move destination determination process in accordance with a cursor move destination selection algorithm for selecting a cursor move destination on the display based on cursor move instruction input information, the cursor move destination determination process comprising:
    executing a search process of a destination component by a search engine based on the cursor move instruction input information, and
    determining a GUI component of the cursor move destination and a direction of a cursor movement,
    wherein the search process is based on coordinate information of GUI components and distances of the GUI components from the cursor;
  a focus manager that executes a move process for the cursor in accordance with cursor move destination instruction information determined by the focus navigator;
  a focus object that executes an animation display process according to a state of the cursor or of the GUI component on which the cursor is set that accompanies a cursor movement carried out by the focus manager; and
  a graphics generator that executes the animation representation of the GUI component, wherein the animation representation comprises a plurality of icons displayed at the same time, each icon having a shape similar to a shape of the GUI component, sequentially generated by the graphics generator towards a moving direction, and wherein the most rear-side icon disappears along with the cursor movement.

2. The apparatus according to claim 1, wherein the animation representation further comprises an image having directional information indicating a direction in which a cursor movement is possible, and the focus object executes an animation display process based on the image having directional information with respect to a component in a focused state.

3. The apparatus according to claim 1, wherein the focus object executes an animation display process comprising images that are different between a focused state in which the cursor is set on a GUI component and a cursor moving state where the cursor moves between GUI components.

4. An animation display processing method that executes, on a display, an animation representation of a cursor or of a Graphical User Interface (GUI) component on which the cursor is set, the animation display processing method comprising:
  executing, a focus navigator, a cursor move destination determination process in accordance with a cursor move destination selection algorithm for selecting a cursor move destination based on cursor move instruction input information, the cursor move destination determination process comprising:
    executing a search process of a destination component by a search engine based on the cursor move instruction input information, and
    determining a GUI component of the cursor move destination and a direction of a cursor movement,
    wherein the search process is based on coordinate information of GUI components and distances of the GUI components from the cursor;
  executing a move process for the cursor by a focus manager in accordance with determined cursor move destination instruction information; and
  executing an animation display process according to a state, which accompanies a cursor movement, of the cursor or of the GUI component on which the cursor is set;
  wherein the animation representation of the GUI component comprises a plurality of icons displayed at the same time, each icon having a shape similar to a shape of the GUI component sequentially generated by the graphics generator towards a moving direction, and wherein the most rear-side icon disappears along with the cursor movement.

5. The animation display processing method according to claim 4, wherein the animation representation further comprises an image having directional information indicating a direction in which a cursor movement is possible, and the method further comprises executing, with respect to a GUI component in a focused state, the animation display process based on the image having directional information.

6. The animation display processing method according to claim 4, wherein the animation display process comprises images that differ between a focused state where the cursor is set on a GUI component and a cursor moving state where the cursor moves between GUI components.

7. A non-transitory computer-readable medium having a computer program that executes, on a display, an animation display processing method for a cursor or a Graphical User Interface (GUI) component on which the cursor is set, the method comprising:
  executing, by a focus navigator, a cursor move destination determination process in accordance with a cursor move destination selection algorithm for selecting a cursor move destination based on cursor move instruction input information, the cursor move destination determination process comprising:
    executing a search process of a destination component by a search engine based on the cursor move instruction input information, and
    determining a GUI component of the cursor move destination and a direction of a cursor movement,
    wherein the search process is based on coordinate information of GUI components and distances of the GUI components from the cursor;
  executing a move process for the cursor by a focus manager in accordance with determined cursor move destination instruction information; and
  executing an animation display process according to a state, which accompanies a cursor movement, of the cursor or of the GUI component on which the cursor is set;
  wherein the animation representation of the GUI component comprises generating a plurality of icons displayed at the same time, each icon having a shape similar to a shape of the GUI component sequentially generated by the graphics generator towards a moving direction, and wherein the most rear-side icon disappears along with the cursor movement.

8. The computer-readable medium according to claim 7, wherein images constituting the animation representation include an image having directional information indicating a direction in which a cursor movement is possible, and the method further comprises executing, with respect to a GUI component in a focused state, the animation display process based on the image having directional information.

9. The computer-readable medium according to claim 7, wherein the animation display process comprises images that differ between a focused state where the cursor is set on a GUI component and a cursor moving state where the cursor moves between GUI components.

* * * * *